(12) United States Patent
Ross et al.

(10) Patent No.: US 11,663,849 B1
(45) Date of Patent: May 30, 2023

(54) TRANSFORM PYRAMIDING FOR FINGERPRINT MATCHING SYSTEM AND METHOD

(71) Applicant: ALITHEON, INC., Bellevue, WA (US)

(72) Inventors: David Justin Ross, Bellevue, WA (US); Mark Tocci, Bellevue, WA (US); Will Charles Shannon, Bellevue, WA (US); Cheng Qian, Bellevue, WA (US)

(73) Assignee: Alitheon, Inc., Bellevue, WA (US)

( * ) Notice: Subject to any disclaimer, the term of this patent is extended or adjusted under 35 U.S.C. 154(b) by 214 days.

(21) Appl. No.: 17/235,608

(22) Filed: Apr. 20, 2021

Related U.S. Application Data

(60) Provisional application No. 63/014,680, filed on Apr. 23, 2020.

(51) Int. Cl.
*G06V 40/12* (2022.01)
*G06F 21/32* (2013.01)
*G06K 9/62* (2022.01)
*G06V 10/75* (2022.01)

(52) U.S. Cl.
CPC .......... *G06V 40/1365* (2022.01); *G06F 21/32* (2013.01); *G06K 9/6289* (2013.01); *G06V 10/757* (2022.01)

(58) Field of Classification Search
CPC .. G06V 40/1365; G06V 10/757; G06F 21/32; G06K 9/6289
See application file for complete search history.

(56) References Cited

U.S. PATENT DOCUMENTS

| | | | |
|---|---|---|---|
| 4,218,674 A | 8/1980 | Brosow et al. |
| 4,423,415 A | 12/1983 | Goldman |
| 4,677,435 A | 6/1987 | Causse et al. |
| 4,700,400 A | 10/1987 | Ross |
| 4,883,971 A | 11/1989 | Jensen |
| 4,921,107 A | 5/1990 | Hofer |
| 5,031,223 A | 7/1991 | Rosenbaum et al. |
| 5,079,714 A | 1/1992 | Manduley et al. |

(Continued)

FOREIGN PATENT DOCUMENTS

| | | |
|---|---|---|
| DE | 102006005927 A1 | 8/2007 |
| EP | 0439669 A2 | 8/1991 |

(Continued)

OTHER PUBLICATIONS

Anonymous, "Intrinsic Characteristics for Authentication" & "Alp Vision Advances Security Through Digital Technology," Authentication News vol. 12, (No. 9) pp. 2, 7 and 8, dated Sep. 2006, 3 pages total.

(Continued)

*Primary Examiner* — Bobbak Safaipour
*Assistant Examiner* — Wassim Mahrouka
(74) *Attorney, Agent, or Firm* — Brake Hughes Bellermann LLP

(57) ABSTRACT

A system and method for better matching of two digital fingerprints when the two digital fingerprints are acquired under different conditions that uses the set of points of interest of the first and second digital fingerprints to perform the matching. A transform pyramiding process is performed using the first and second set of points of interest and a hierarchy of transforms to determine if the first and second set of points of interest are true matches despite the different conditions.

30 Claims, 9 Drawing Sheets

(56) References Cited

U.S. PATENT DOCUMENTS

| | | |
|---|---|---|
| 5,393,939 A | 2/1995 | Nasuta et al. |
| 5,422,821 A | 6/1995 | Allen et al. |
| 5,514,863 A | 5/1996 | Williams |
| 5,518,122 A | 5/1996 | Tilles et al. |
| 5,521,984 A | 5/1996 | Denenberg et al. |
| 5,703,783 A | 12/1997 | Allen et al. |
| 5,719,939 A | 2/1998 | Tel |
| 5,734,568 A | 3/1998 | Borgendale et al. |
| 5,745,590 A | 4/1998 | Pollard |
| 5,883,971 A | 3/1999 | Bolle et al. |
| 5,923,848 A | 7/1999 | Goodhand et al. |
| 5,974,150 A | 10/1999 | Kaish et al. |
| 6,205,261 B1 | 3/2001 | Goldberg |
| 6,246,794 B1 | 6/2001 | Kagehiro et al. |
| 6,292,709 B1 | 9/2001 | Uhl et al. |
| 6,327,373 B1 | 12/2001 | Yura |
| 6,343,327 B2 | 1/2002 | Daniels et al. |
| 6,360,001 B1 | 3/2002 | Berger et al. |
| 6,370,259 B1 | 4/2002 | Hobson et al. |
| 6,400,805 B1 | 6/2002 | Brown et al. |
| 6,424,728 B1 | 7/2002 | Ammar |
| 6,434,601 B1 | 8/2002 | Rollins |
| 6,470,091 B2 | 10/2002 | Koga et al. |
| 6,539,098 B1 | 3/2003 | Baker et al. |
| 6,549,892 B1 | 4/2003 | Sansone |
| 6,597,809 B1 | 7/2003 | Ross et al. |
| 6,643,648 B1 | 11/2003 | Ross et al. |
| 6,697,500 B2 | 2/2004 | Woolston et al. |
| 6,741,724 B1 | 5/2004 | Bruce et al. |
| 6,768,810 B2 | 7/2004 | Emanuelsson et al. |
| 6,778,703 B1 | 8/2004 | Zlotnick |
| 6,805,926 B2 | 10/2004 | Cote et al. |
| 6,816,602 B2 | 11/2004 | Coffelt et al. |
| 6,829,369 B2 | 12/2004 | Poulin et al. |
| 6,961,466 B2 | 11/2005 | Imagawa et al. |
| 6,985,925 B2 | 1/2006 | Ogawa |
| 6,985,926 B1 | 1/2006 | Ferlauto et al. |
| 7,016,532 B2 | 3/2006 | Boncyk et al. |
| 7,031,519 B2 | 4/2006 | Elmenhurst |
| 7,096,152 B1 | 8/2006 | Ong |
| 7,120,302 B1 | 10/2006 | Billester |
| 7,121,458 B2 | 10/2006 | Avant et al. |
| 7,152,047 B1 | 12/2006 | Nagel |
| 7,171,049 B2 | 1/2007 | Snapp |
| 7,204,415 B2 | 4/2007 | Payne et al. |
| 7,212,949 B2 | 5/2007 | Bachrach |
| 7,333,987 B2 | 2/2008 | Ross et al. |
| 7,343,623 B2 | 3/2008 | Ross |
| 7,356,162 B2 | 4/2008 | Caillon |
| 7,379,603 B2 | 5/2008 | Ross et al. |
| 7,436,979 B2 | 10/2008 | Bruce et al. |
| 7,477,780 B2 | 1/2009 | Boncyk et al. |
| 7,518,080 B2 | 4/2009 | Amato |
| 7,602,938 B2 | 10/2009 | Prokoski |
| 7,674,995 B2 | 3/2010 | Desprez et al. |
| 7,676,433 B1 | 3/2010 | Ross et al. |
| 7,680,306 B2 | 3/2010 | Boutant et al. |
| 7,720,256 B2 | 5/2010 | Desprez et al. |
| 7,726,457 B2 | 6/2010 | Maier et al. |
| 7,726,548 B2 | 6/2010 | Delavergne |
| 7,748,029 B2 | 6/2010 | Ross |
| 7,822,263 B1 | 10/2010 | Prokoski |
| 7,834,289 B2 | 11/2010 | Orbke et al. |
| 7,853,792 B2 | 12/2010 | Cowburn |
| 8,022,832 B2 | 9/2011 | Vogt et al. |
| 8,032,927 B2 | 10/2011 | Ross |
| 8,108,309 B2 | 1/2012 | Tan |
| 8,180,174 B2 | 5/2012 | Di et al. |
| 8,180,667 B1 | 5/2012 | Baluja et al. |
| 8,194,938 B2 | 6/2012 | Wechsler et al. |
| 8,316,418 B2 | 11/2012 | Ross |
| 8,374,020 B2 | 2/2013 | Katti |
| 8,374,399 B1 | 2/2013 | Talwerdi |
| 8,374,920 B2 | 2/2013 | Hedges et al. |
| 8,391,583 B1 | 3/2013 | Mennie et al. |
| 8,428,772 B2 | 4/2013 | Miette et al. |
| 8,437,530 B1 | 5/2013 | Mennie et al. |
| 8,457,354 B1 | 6/2013 | Kolar et al. |
| 8,477,992 B2 | 7/2013 | Paul et al. |
| 8,520,888 B2 | 8/2013 | Spitzig et al. |
| 8,526,743 B1 | 9/2013 | Campbell et al. |
| 8,774,455 B2 | 7/2014 | Elmenhurst et al. |
| 8,959,029 B2 | 2/2015 | Jones et al. |
| 9,031,329 B1 | 5/2015 | Farid et al. |
| 9,058,543 B2 | 6/2015 | Campbell et al. |
| 9,152,862 B2 | 10/2015 | Ross et al. |
| 9,170,654 B1 | 10/2015 | Boncyk et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,552 B2 | 5/2016 | Elmenhurst et al. |
| 9,350,714 B2 | 5/2016 | Freeman et al. |
| 9,361,507 B1 | 6/2016 | Hoyos et al. |
| 9,361,596 B2 | 6/2016 | Ross et al. |
| 9,424,461 B1 | 8/2016 | Yuan et al. |
| 9,443,298 B2 | 9/2016 | Ross et al. |
| 9,558,463 B2 | 1/2017 | Ross et al. |
| 9,582,714 B2 | 2/2017 | Ross et al. |
| 9,646,206 B2 | 5/2017 | Ross et al. |
| 9,665,800 B1 | 5/2017 | Kuffner |
| 9,741,724 B2 | 8/2017 | Seshadri et al. |
| 10,037,537 B2 | 7/2018 | Withrow et al. |
| 10,043,073 B2 | 8/2018 | Ross et al. |
| 10,192,140 B2 | 1/2019 | Ross et al. |
| 10,199,886 B2 | 2/2019 | Li et al. |
| 10,346,852 B2 | 7/2019 | Ross et al. |
| 10,505,726 B1 | 12/2019 | Andon et al. |
| 10,540,664 B2 | 1/2020 | Ross et al. |
| 10,572,883 B2 | 2/2020 | Ross et al. |
| 10,621,594 B2 | 4/2020 | Land et al. |
| 2001/0010334 A1 | 8/2001 | Park et al. |
| 2001/0054031 A1 | 12/2001 | Lee et al. |
| 2002/0015515 A1 | 2/2002 | Lichtermann et al. |
| 2002/0073049 A1 | 6/2002 | Dutta |
| 2002/0134836 A1 | 9/2002 | Cash et al. |
| 2002/0168090 A1 | 11/2002 | Bruce et al. |
| 2003/0015395 A1 | 1/2003 | Hallowell et al. |
| 2003/0046103 A1 | 3/2003 | Amato et al. |
| 2003/0091724 A1 | 5/2003 | Mizoguchi |
| 2003/0120677 A1 | 6/2003 | Vernon |
| 2003/0138128 A1 | 7/2003 | Rhoads |
| 2003/0179931 A1 | 9/2003 | Sun |
| 2003/0182018 A1 | 9/2003 | Snapp |
| 2003/0208298 A1 | 11/2003 | Edmonds |
| 2003/0219145 A1 | 11/2003 | Smith |
| 2004/0027630 A1 | 2/2004 | Lizotte |
| 2004/0101174 A1 | 5/2004 | Sato et al. |
| 2004/0112962 A1 | 6/2004 | Farrall et al. |
| 2004/0218791 A1 | 11/2004 | Jiang et al. |
| 2004/0218801 A1 | 11/2004 | Houle et al. |
| 2004/0250085 A1 | 12/2004 | Tattan et al. |
| 2005/0007776 A1 | 1/2005 | Monk et al. |
| 2005/0038756 A1 | 2/2005 | Nagel |
| 2005/0065719 A1 | 3/2005 | Khan et al. |
| 2005/0086256 A1 | 4/2005 | Owens et al. |
| 2005/0111618 A1 | 5/2005 | Sommer et al. |
| 2005/0119786 A1 | 6/2005 | Kadaba |
| 2005/0125360 A1 | 6/2005 | Tidwell et al. |
| 2005/0131576 A1 | 6/2005 | De et al. |
| 2005/0137882 A1 | 6/2005 | Cameron et al. |
| 2005/0160271 A9 | 7/2005 | Brundage et al. |
| 2005/0169529 A1 | 8/2005 | Owechko et al. |
| 2005/0188213 A1 | 8/2005 | Xu |
| 2005/0204144 A1 | 9/2005 | Mizutani |
| 2005/0251285 A1 | 11/2005 | Boyce et al. |
| 2005/0257064 A1 | 11/2005 | Boutant et al. |
| 2005/0289061 A1 | 12/2005 | Kulakowski et al. |
| 2006/0010503 A1 | 1/2006 | Inoue et al. |
| 2006/0083414 A1 | 4/2006 | Neumann et al. |
| 2006/0109520 A1 | 5/2006 | Gossaye et al. |
| 2006/0131518 A1 | 6/2006 | Ross et al. |
| 2006/0177104 A1 | 8/2006 | Prokoski |
| 2006/0253406 A1 | 11/2006 | Caillon |
| 2007/0056041 A1 | 3/2007 | Goodman |

(56) References Cited

U.S. PATENT DOCUMENTS

| | | |
|---|---|---|
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0230656 A1 | 10/2007 | Lowes et al. |
| 2007/0263267 A1 | 11/2007 | Ditt |
| 2007/0269043 A1 | 11/2007 | Launay et al. |
| 2007/0282900 A1 | 12/2007 | Owens et al. |
| 2008/0008377 A1 | 1/2008 | Andel et al. |
| 2008/0011841 A1 | 1/2008 | Self et al. |
| 2008/0128496 A1 | 6/2008 | Bertranou et al. |
| 2008/0130947 A1 | 6/2008 | Ross et al. |
| 2008/0219503 A1 | 9/2008 | Di et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1 | 11/2008 | Bennett et al. |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1 | 5/2009 | Ikeda |
| 2009/0154778 A1 | 6/2009 | Lei et al. |
| 2009/0157733 A1 | 6/2009 | Kim et al. |
| 2009/0223099 A1 | 9/2009 | Versteeg |
| 2009/0232361 A1 | 9/2009 | Miller |
| 2009/0245652 A1 | 10/2009 | Bastos |
| 2009/0271029 A1 | 10/2009 | Doutre |
| 2009/0287498 A2 | 11/2009 | Choi |
| 2009/0307005 A1 | 12/2009 | Omartin et al. |
| 2010/0027834 A1 | 2/2010 | Spitzig et al. |
| 2010/0054551 A1 | 3/2010 | Decoux |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2010/0286815 A1 | 11/2010 | Zimmermann |
| 2011/0026831 A1 | 2/2011 | Perronnin et al. |
| 2011/0064279 A1 | 3/2011 | Uno |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2011/0267192 A1 | 11/2011 | Goldman et al. |
| 2012/0042171 A1 | 2/2012 | White et al. |
| 2012/0089639 A1 | 4/2012 | Wang |
| 2012/0130868 A1 | 5/2012 | Loeken |
| 2012/0177281 A1 | 7/2012 | Frew |
| 2012/0185393 A1 | 7/2012 | Atsmon et al. |
| 2012/0199651 A1 | 8/2012 | Glazer |
| 2012/0242481 A1 | 9/2012 | Gernandt et al. |
| 2012/0243797 A1 | 9/2012 | Di Venuto Dayer et al. |
| 2012/0250945 A1 | 10/2012 | Peng et al. |
| 2013/0162394 A1 | 6/2013 | Etchegoyen |
| 2013/0212027 A1 | 8/2013 | Sharma et al. |
| 2013/0214164 A1 | 8/2013 | Zhang et al. |
| 2013/0273968 A1 | 10/2013 | Rhoads et al. |
| 2013/0277425 A1 | 10/2013 | Sharma et al. |
| 2013/0284803 A1 | 10/2013 | Wood et al. |
| 2014/0032322 A1 | 1/2014 | Schwieger et al. |
| 2014/0140570 A1 | 5/2014 | Ross et al. |
| 2014/0140571 A1 | 5/2014 | Elmenhurst et al. |
| 2014/0184843 A1 | 7/2014 | Campbell et al. |
| 2014/0201094 A1 | 7/2014 | Herrington et al. |
| 2014/0270341 A1 | 9/2014 | Elmenhurst et al. |
| 2014/0314283 A1 | 10/2014 | Harding |
| 2014/0380446 A1 | 12/2014 | Niu et al. |
| 2015/0058142 A1 | 2/2015 | Lenahan et al. |
| 2015/0067346 A1 | 3/2015 | Ross et al. |
| 2015/0078629 A1 | 3/2015 | Gottemukkula et al. |
| 2015/0086068 A1 | 3/2015 | Mulhearn et al. |
| 2015/0117701 A1 | 4/2015 | Ross et al. |
| 2015/0127430 A1 | 5/2015 | Hammer |
| 2015/0248587 A1 | 9/2015 | Oami et al. |
| 2015/0294189 A1 | 10/2015 | Benhimane et al. |
| 2015/0309502 A1 | 10/2015 | Breitgand et al. |
| 2015/0371087 A1 | 12/2015 | Ross et al. |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0117631 A1 | 4/2016 | Mccloskey et al. |
| 2016/0162734 A1 | 6/2016 | Ross et al. |
| 2016/0180546 A1 | 6/2016 | Kim et al. |
| 2016/0189510 A1 | 6/2016 | Hutz |
| 2016/0203387 A1 | 7/2016 | Lee et al. |
| 2016/0300234 A1 | 10/2016 | Moss-Pultz et al. |
| 2016/0335520 A1 | 11/2016 | Ross et al. |
| 2017/0004444 A1 | 1/2017 | Krasko et al. |
| 2017/0032285 A1 | 2/2017 | Sharma et al. |
| 2017/0132458 A1 | 5/2017 | Short et al. |
| 2017/0153069 A1 | 6/2017 | Huang et al. |
| 2017/0243230 A1 | 8/2017 | Ross et al. |
| 2017/0243231 A1 | 8/2017 | Withrow et al. |
| 2017/0243232 A1 | 8/2017 | Ross et al. |
| 2017/0243233 A1 | 8/2017 | Land et al. |
| 2017/0249491 A1 | 8/2017 | Macintosh et al. |
| 2017/0251143 A1 | 8/2017 | Peruch et al. |
| 2017/0253069 A1 | 9/2017 | Kerkar et al. |
| 2017/0295301 A1 | 10/2017 | Liu et al. |
| 2017/0300905 A1 | 10/2017 | Withrow et al. |
| 2017/0344823 A1 | 11/2017 | Withrow et al. |
| 2017/0344824 A1 | 11/2017 | Martin |
| 2017/0372327 A1 | 12/2017 | Withrow |
| 2018/0012008 A1 | 1/2018 | Withrow et al. |
| 2018/0018627 A1 | 1/2018 | Ross et al. |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0047128 A1 | 2/2018 | Ross et al. |
| 2018/0053312 A1 | 2/2018 | Ross et al. |
| 2018/0121643 A1 | 5/2018 | Talwerdi et al. |
| 2018/0144211 A1 | 5/2018 | Ross et al. |
| 2018/0315058 A1 | 11/2018 | Withrow et al. |
| 2018/0349694 A1 | 12/2018 | Ross et al. |
| 2019/0026581 A1 | 1/2019 | Leizerson |
| 2019/0034518 A1 | 1/2019 | Liu et al. |
| 2019/0034694 A1 | 1/2019 | Ross |
| 2019/0102873 A1 | 4/2019 | Wang et al. |
| 2019/0102973 A1 | 4/2019 | Oyama et al. |
| 2019/0130082 A1 | 5/2019 | Alameh et al. |
| 2019/0228174 A1 | 7/2019 | Withrow et al. |
| 2019/0287118 A1 | 9/2019 | Ross et al. |
| 2019/0342102 A1 | 11/2019 | Hao et al. |
| 2020/0153822 A1 | 5/2020 | Land et al. |
| 2020/0226366 A1 | 7/2020 | Withrow et al. |
| 2020/0233901 A1 | 7/2020 | Crowley et al. |
| 2020/0250395 A1 | 8/2020 | Ross et al. |
| 2020/0257791 A1 | 8/2020 | Shannon et al. |
| 2020/0334689 A1 | 10/2020 | Withrow |
| 2020/0349379 A1 | 11/2020 | Ross |
| 2020/0356772 A1 | 11/2020 | Withrow et al. |

FOREIGN PATENT DOCUMENTS

| | | |
|---|---|---|
| EP | 0759596 A2 | 2/1997 |
| EP | 1016548 A2 | 7/2000 |
| EP | 1016549 A1 | 7/2000 |
| EP | 1719070 B1 | 4/2009 |
| EP | 2107506 A1 | 10/2009 |
| EP | 2166493 A1 | 3/2010 |
| EP | 2195621 B1 | 11/2013 |
| EP | 2866193 A1 | 4/2015 |
| EP | 2257909 B1 | 5/2015 |
| EP | 2869240 A2 | 5/2015 |
| EP | 2869241 A2 | 5/2015 |
| EP | 3208744 A1 | 8/2017 |
| EP | 3249581 A1 | 11/2017 |
| EP | 3270342 A1 | 1/2018 |
| EP | 3435287 A2 | 1/2019 |

(56) References Cited

FOREIGN PATENT DOCUMENTS

| | | |
|---|---|---|
| EP | 3514715 A1 | 7/2019 |
| GB | 2097979 A | 11/1982 |
| GB | 2482127 A | 1/2012 |
| JP | 61234481 A | 10/1986 |
| JP | H07192112 | 7/1995 |
| JP | 2007213148 A | 8/2007 |
| KR | 20120009654 A | 2/2012 |
| WO | 2005086616 A2 | 9/2005 |
| WO | 2006038114 A1 | 4/2006 |
| WO | 2007028799 A1 | 3/2007 |
| WO | 2007031176 A1 | 3/2007 |
| WO | 2007071788 A1 | 6/2007 |
| WO | 2007090437 A1 | 8/2007 |
| WO | 2007144598 A1 | 12/2007 |
| WO | 2009030853 A1 | 3/2009 |
| WO | 2009089126 A1 | 7/2009 |
| WO | 2009115611 A2 | 9/2009 |
| WO | 2010018464 A2 | 2/2010 |
| WO | 2010018646 A1 | 2/2010 |
| WO | 2012145842 A1 | 11/2012 |
| WO | 2013051019 A1 | 4/2013 |
| WO | 2013126221 A1 | 8/2013 |
| WO | 2013173408 A1 | 11/2013 |
| WO | 2015004434 A1 | 1/2015 |
| WO | 2016081831 A1 | 5/2016 |

OTHER PUBLICATIONS

Bao et al., "Local Feature based Multiple Object Instance Identification using Scale and Rotation Invariant Implicit Shape Model," 12th Asian Conference on Computer Vision, Singapore, Singapore, Nov. 1-5, 2014, pp. 600-614.

Beekhof et al., "Secure Surface Identification Codes," Proceeding of the SPIE 6819: Security Forensics, Steganography, and Watermarking of Multimedia Contents X:68190D, 2008. (12 pages).

Buchanan et al., "Fingerprinting documents and packaging," Nature 436 (7050): 475, 2005.

Cavoukian et al. "Biometric Encryption: Technology for Strong Authentication, Security and Privacy," 2008, WE, Intl. Fed. Iot Info Processing, vol. 261; Policies and Research in Identity Management; pp. 57-77.

Di Paola et al., "An Autonomous Mobile Robotic System for Surveillance of Indoor Environments," International Journal of Advanced Robotic Systems 7(1): 19-26, 2010.

Drew, M. S., et al., "Sharpening from Shadows: Sensor Transforms for Removing Shadows using a Single Image," Color and Imaging Conference, vol. 5, Society for Imaging Science and Technology, 2009, pp. 267-271.

Ebay, "eBay Launches Must-Have !Phone App Red Laser 3.0" published Nov. 18, 2011; https://www.ebayinc.com/stories/news/ebay-launches-must-have-iphone-app-redlaser-30/, downloaded Mar. 21, 2019, 7 pages).

Entropy.com Website History, Wayback Machine; https://web.archive.org/web/20160330060808/https://www.entrupy.com/; Mar. 30, 2016 (Year: 2016), 2 pages.

Extended European Search Report Application No. 21153877.2, dated Jun. 15, 2021, 8 pages.

Extended European Search Report, dated Jun. 18, 2021, for European Application No. 21153355.9, 8 pages.

Farid, "Digital Image Forensics", Dartmouth CS 89/189, Sprint 2013; 199 pages.

Fischler et al., "Random Sample Consensus: A Paradigm for Model Fitting with Applications to Image Analysis and Automated Cartography," Communication of the ACM 24(6); 381-395, 1981.

Huang et al., "A Novel Binarization Algorithm for Ballistic Imaging Systems," 3rd International Congress on Image and Signal Processing, Yantai, China, Oct. 16-18, 2010, pp. 1287-1291.

Huang, et al., "An Online Ballistics Imaging System for Firearm Identification"; 2nd International Conference on Signal Processing Systems, Dalian, China, Jul. 5-7, 2010, vol. 2, pp. 68-72.

Kartik et al., "Security System with Face Recognition, SMS Alert and Embedded Network Video Monitoring Terminal," International Journal of Security, Privacy and Trust Management 2(5):9-19, 2013.

Li, "Image Processing for the Positive Identification of Forensic Ballistics Specimens," Proceedings of the 6th International Conference of Information Fusion, Cairns, Australia, Jul. 8-11, 2003, pp. 1494-1498.

Li, "Firearm Identification System Based on Ballistics Image Processing," Congress on Image and Signal Processing, School of Computer and Information Science, Faculty of Computing, Health and Science Edith Cowan University, Perth, Australia pp. 149-154.

Maddern et al., "Illumination Invariant Imaging: Applications in Robust Vision-based Localization, Mapping and Classification for Autonomous Vehicles," IEEE International Conference on Robotics and Automation, Hong Kong, May 31-Jun. 7, 2014, 8 pages.

Matsumoto et al., "Nano-artifact metrics based on random collapse of resist," Scientific Reports 4:6142, 2014 (5 pages).

Mistry et al., "Comparison of Feature Detection and Matching Approaches: SIFT and SURF," Global Research and Development Journal for Engineering, vol. 2, Issue 4, Mar. 2017, 8 pages.

Online NCOALink ® Processing Acknowledgement Form (PAF) Released by Lorton Data, Jun. 2, 2009, URL=http://us.generation-nt.com/online-ncoalink-processingacknowledgement-form-paf-released-by-press-1567191.html, download date Jun. 25, 2010, 2 pages.

Rublee et al., "ORB: an efficient alternative to SIFT or SURF," IEEE International Conference on Computer Vision, Barcelona, Spain, Nov. 6-13, 2011, 8 pages.

Schneider et al., "A Robust Content Based Digital Signature for Image Authentication," Proceeding of the International Conference on Image Processing Lausanne, Switzerland, Sep. 19, 1996, pp. 227-230.

Schwabe Williamson & Wyatt, PC—Listing of Related Cases; dated Sep. 16, 2017; 2 pages.

Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.

Shi et al., "Smart Cameras: Fundamentals and Classification," Chapter 2, Belbachir (ed.), Smart Cameras, Springer, New York, New York, USA 2010, pp. 19-34.

Shields, "HowTo Shop Savvy With Red Laser," published online on Mar. 22, 2010; https://iphone.appstomn.net/reviews/lifestyle/how-to-shop-savvy-with-redlaser/, downloaded Mar. 22, 2010, 8 pages).

Smith, "Fireball: A Forensic Ballistic Imaging System: Proceedings of the 31st Annual International Carnahan Conference on Security Technology," Canberra, Australia, Oct. 15-17, 1997, pp. 64-70.

Takahashi et al., "Mass-produced Parts Traceability System Based on Automated Scanning of Fingerprint of Things," 15th IAPR International Conference on Machine Vision Applications, Nagoya, Japan, May 8-12, 2017, 5 pages.

United States Postal Service, "NCOALink Systems", http://www.usps.com/ncsc/addressservices/moveupdate/changeaddress.htm, website accessed Jun. 23, 2010, 2 pages.

United States Postal Service, "Postal Addressing Standards," Publication Jul. 28, 2008, 55 pages.

United States Postal Services, NCOALink® Systems, dated May 27, 2009, URL=http://ribbs.usps.gov/ncoalink/ncoalink_print.htm, download date Jun. 23, 2010, 3 pages.

Veena et al., "Automatic Theft Security System (Smart Surveillance Camera)," Computer Science & Information Technology 3:75-87, 2013.

Woods, "Counterfeit-spotting truth machine launches out of Dumbo," published online on Feb. 11, 2016, downloaded from http://technically/brooklyn/2016/02/11/entrupy-counterfeit-scanner/ on Mar. 20, 2019, 3 pages.

Farid, Ahmed, et al., "Integrated fingerprint verification method using a composite signature-based watermarking technique", Optical Engineering, The Catholic University of America, (Year: 2007), 6 pages.

Jain, Anil K, et al., "Biometric Cryptosystems: Issues and Challenges", Proceedings of the IEEE, IEEE, New York, US, vol. 92, No. 6, Jun. 1, 2004, XP011112757, pp. 948-960.

(56) References Cited

OTHER PUBLICATIONS

Truong, Hieu C, et al., "Royal Canadian Mint/Signoptic Technologies Coin DNA Technology", World Money Fair (WMF) Berlin Feb. 1-3, 2011, http://www.amisdeleuro.org/upload/1340734488.pptx, 22 pages.

Zaeri, Naser, "Minutiae-based Fingerprint Extraction and Recognition, 2020 (year 2010)", 47 pages.

800 802

800 802

800 802

TRANSFORM PYRAMIDING FOR FINGERPRINT MATCHING SYSTEM AND METHOD

FIELD

The disclosure relates generally to matching of digital fingerprints and in particular to a system and method that performs transform pyramiding in order to better match digital fingerprints of objects that undergo change.

BACKGROUND

The generation of a digital fingerprint for a rigid object can be performed in a number of different ways wherein the digital fingerprint can be used, for example, to authenticate that rigid object later. Some of these known digital fingerprinting systems use an image of an object or an image of something attached to the object (a tag, a code, etc.) in order to generate the digital fingerprint that is inducted into a database or other storage so that the digital fingerprint can be used for a later authentication process. These systems are not very accurate at authenticating the object.

Part of the authentication process includes matching a digital fingerprint of the original object and a digital fingerprint captured from that same object at a later time. The two digital fingerprints may be acquired under different conditions that cause differences between the two digital fingerprints, for example differences that stem from changes in viewing angle and/or position of the object for each digital fingerprint relative to a device that acquires the digital fingerprint, changes in illumination of the object for each digital fingerprint, and/or changes in the object itself between each acquired digital fingerprint. The changes in the viewing angle and/or position of the object may also include movement and/or rotation of the object. The changes in the object may include shape changes that may be elastic.

It is desirable to be able to ameliorate these differences between the two digital fingerprints since these changes can modify the digital fingerprints sufficiently to cause the authentication to fail even where it is the same object as previously digitally fingerprinted. Thus, it is desirable to provide a system and method that ameliorates the effects of differences between successively captured digital fingerprints and it is to this end that the disclosure is directed.

DETAILED DESCRIPTION OF ONE OR MORE EMBODIMENTS

Figure 1:
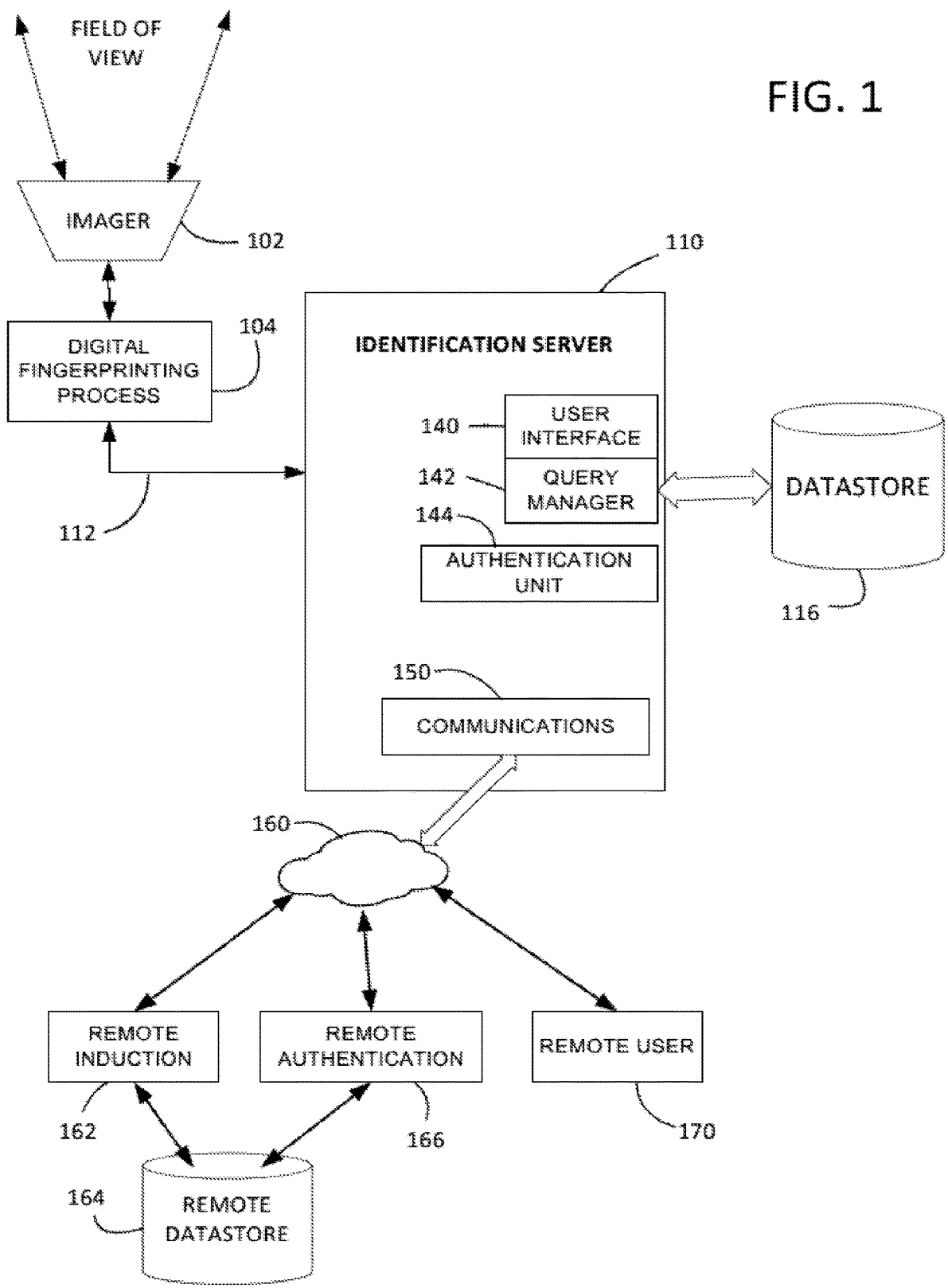
FIG. 1 is a schematic diagram illustrating an object authentication system that uses digital fingerprints.

The disclosure is particularly applicable to systems and methods for matching digital fingerprints in which the digital fingerprints of the object have changed between two acquisitions due to different conditions. In at least one implementation of a system, the object being authenticated using the digital fingerprint may be any object for which digital fingerprints may be acquired. The objects may include rigid objects or deformable or malleable objects and may further include inanimate objects or living being body parts including faces, hands, etc. Thus, the systems and methods described below may be used with any object for which digital fingerprints may be acquired. The described systems and methods may advantageously improve the matching process of the digital fingerprints that occurs when the object is being authenticated using those digital fingerprints. The system(s) will be described with respect to improvement in the matching process with respect to changes in the objects and with respect to changes in the view of the object by the device that acquires images from which the digital fingerprints are derived, but is not so limited. Furthermore, the disclosed system(s) and method(s) is disclosed for objects with two-dimensional surfaces since many objects are effectively two-dimensional, and most images taken by cameras, even of fully three-dimensional objects, are two-dimensional. Nonetheless the teachings below should be understood to cover higher-dimensional objects (e.g., points of interest taken from the surface of a strongly three-dimensional object, from the inside of such an object, or taken across time from a changing object).

In at least one embodiment, a transform pyramiding process, as disclosed below in more detail, may be used to improve the digital fingerprint matching process and thus the authentication process and system and make those processes less susceptible to failed authentication due to differences between the digital fingerprints causes by different conditions of acquisition of each digital fingerprint. It should be noted that each digital fingerprint is a complex combination of data that cannot be easily kept in the human mind nor on a pen and paper by a human being. Furthermore, the matching process and authentication process, due to at least the complexity of the digital fingerprints, cannot be performed in the human mind nor with pen and paper. Furthermore, the matching process and the authentication process are technological processes whose efficacy is improved using the disclosed system(s) and method(s).

For example, the disclosed system(s) and method(s) causes substantial speed-up of the matching of two sets of digital fingerprints to determine whether the digital fingerprints pertain to different appearances of the same object. In a conventional system, the matching may be too slow for practical use under many foreseeable conditions. As an example, finding matching pairs between two acquisitions of an object seen off-axis (that is, seen after a rotation around an axis perpendicular to the direction between the camera and the object, thus introducing a homographic transform) is greatly speeded up as discussed below in detail by first approximating the distortion by an affine transform. Both affine (six parameters) and homographic (eight parameters) transforms are characterizable by a limited set of parameters but determining eight parameters starting from scratch is exponentially more difficult than starting from a known affine transform. This improvement cannot be achieved by a human being alone nor by a human being with pen and paper.

A second taught improvement is that the matching and authentication processes can be accurate and sufficiently quick even for an object that has been distorted (or whose acquired digital fingerprint has been distorted) by a transform that is not easily (or at all) characterizable by a limited parameter set. An example is a rubber-sheet distortion of a plastic object (such as a face, a handbag, or a duffel bag). A "rubber sheet" distortion is one where the object may vary in inconsistent ways across its surface from one acquisition to the other. The face of a person talking is a good example. In general such a distortion cannot be well modeled by a small number of parameters spanning the entire object, but very often (essentially always in physically-realizable objects) the overall transform can be well characterized by a series of transforms of local regions than are then linked together to characterize the overall transform.

FIG. 1 shows an object authentication system that uses digital fingerprints that may be improved using the disclosed transform pyramiding technique, according to at least one illustrated implementation. In the system, an object (not shown) may be placed into the field of view (indicated by the dashed lines) of the scanner or imager 102. The captured image or image data is processed by a process 104 to extract digital fingerprint(s) therefrom. Digital fingerprinting is described in more detail below. These elements may be discrete or integrated. For example, the scanner or imager may be a camera in a smartphone, and the digital fingerprinting process may be an application (app) comprising a set of processor-executable instructions stored and executable on the same smartphone. Alternatively, intermediate data (for example, digital image data) may be transmitted over a network to a remote processor to generate one or more digital fingerprints from the image data. For example, a remote induction facility 162 may communicate over a network 160 with an identification server 110, or simply induct the object by storing generated digital fingerprints into a datastore 164 (e.g., database) coupled to the induction facility. The induction facility may comprise, for example, a program or a programmed server as well as another imager 102.

The digital fingerprint of the object may be securely communicated to the server 110 via path 112 using known communications technology. The server 110 is coupled to (or includes) a datastore 116. The datastore may contain various databases and or tables, including, for example, records that store digital fingerprints. The server may implement, for example, a user interface 140, a query manager 142 for interaction with the datastore 116, and an authentication unit, process, and or application 144. One use of the authentication unit 144 may be to identify and/or authenticate an object based on an acquired digital fingerprint or the matching of two digital fingerprints of the object acquired at different time and under different conditions. To identify and/or authenticate an object, the authentication unit 144 may acquire a digital fingerprint (from a local scanner 102 or remotely 162) and using the query manager 142, search the datastore 116 to find a matching (or best match) digital fingerprint record. In one aspect, it is this matching and/or authentication process that are improved using the transform pyramiding technique that is discussed below in more detail. The transform pyramiding technique may be performed by various combinations of the elements of the system in FIG. 1 and may be implemented as a plurality of lines of computer code executed by a processor of an element in FIG. 1 or may be implemented in a piece of hardware that performs the operations/processes of the transform pyramiding technique.

In this illustrative example, the server 110 typically may also include a communications component 150. Various communications components 150 may be included to communicate for example, over a network 160 which may be local, wide area, internet, etc. The data control server may implement record keeping and various other workflows. Without limitation, communications components 150 may include any one or more of wired communications ports, wireless transmitters, wireless receivers, wireless transceivers, and/or radios.

All forms of capturing 2D, 3D surface, 3D depth (i.e., "inside"), and features that change during the acquisitions are in view of the present disclosure. It is noted that the disclosure of the embodiment below pertains to similarity, affine, and homographic transforms of 2D images using homographic (also called planar projective) transforms using a 3×3 matrix as disclosed below. However, the disclosed method may also be used for 3D objects and surfaces with full projective transforms (that describe the way a fully 3D shape, rotating in space, appears at two different instants). The full projective transforms may be can be expressed as a transform matrix that is 4×4 and by using one or more mathematical equations that can be derived based on the 2D image examples provided below.

Thus, in alternative embodiments, the method may be used with a 3D surface, a 3D interior or a 4D changing 3D object that would use similar processes as the 2D images described below and the same transform pyramiding may be used as described below. For example, if a stereo image of a person saying his/her name is captured using synchronized normal cameras run in video mode, the disclosed method may be used to perform the below disclosed matching of two captures/acquisitions using the transform pyramiding in the following manner. The method may start with using similarity transforms of individual images of the two videos, use the 2D affinity transforms, and then the 2D homography transform as described below in more detail. The method may then use full projective transforms and then finally change between different full projective transforms to express changes across time.

The capturing thus may include photon-based forms such as X-rays, tomography or image/video capture using a smartphone device camera, and also non-photon approaches such as ultrasound. In the simplified drawing of FIG. 1, the imager 102 may comprise any or all of these imaging technologies. The imager 102 may collect one or more still images and may assemble them into a video of the object. Electromagnetic radiation in different frequency ranges can be used to gather both surface image information and shape information, which may individually or in combination contribute to the characterization of a point of interest. Different methods can be concurrently used for the two types of data. For example, an infrared depth camera can provide shape information, and a visual light camera can provide surface image characteristics. The shape information and surface image characteristics information can be combined into the digital fingerprint. The apparatus of this disclosure may use visible light, infrared (IR), ultraviolet (UV), and any other method of collecting surface image characteristics. Sound recorders may acquire sound characteristics of the object. The present disclosure covers the use of any method of gathering surface image and/or shape information, including stereo, focus stacking, structure from motion, pattern projection, time-of-flight, and Lidar. The present disclosure covers any method of collecting internal data, whether depth-based, projective, or of any other means, including X-Rays, tomography, and high-frequency microwaves. The present disclosure covers any one or combination of these methods of capturing, gathering, and collecting information, and any other like means of acquiring such information, whether effectively instantaneously or over a period of time. It also covers mixed mode acquisitions of data used to digitally fingerprint different characteristics of the object.

Figure 2A:
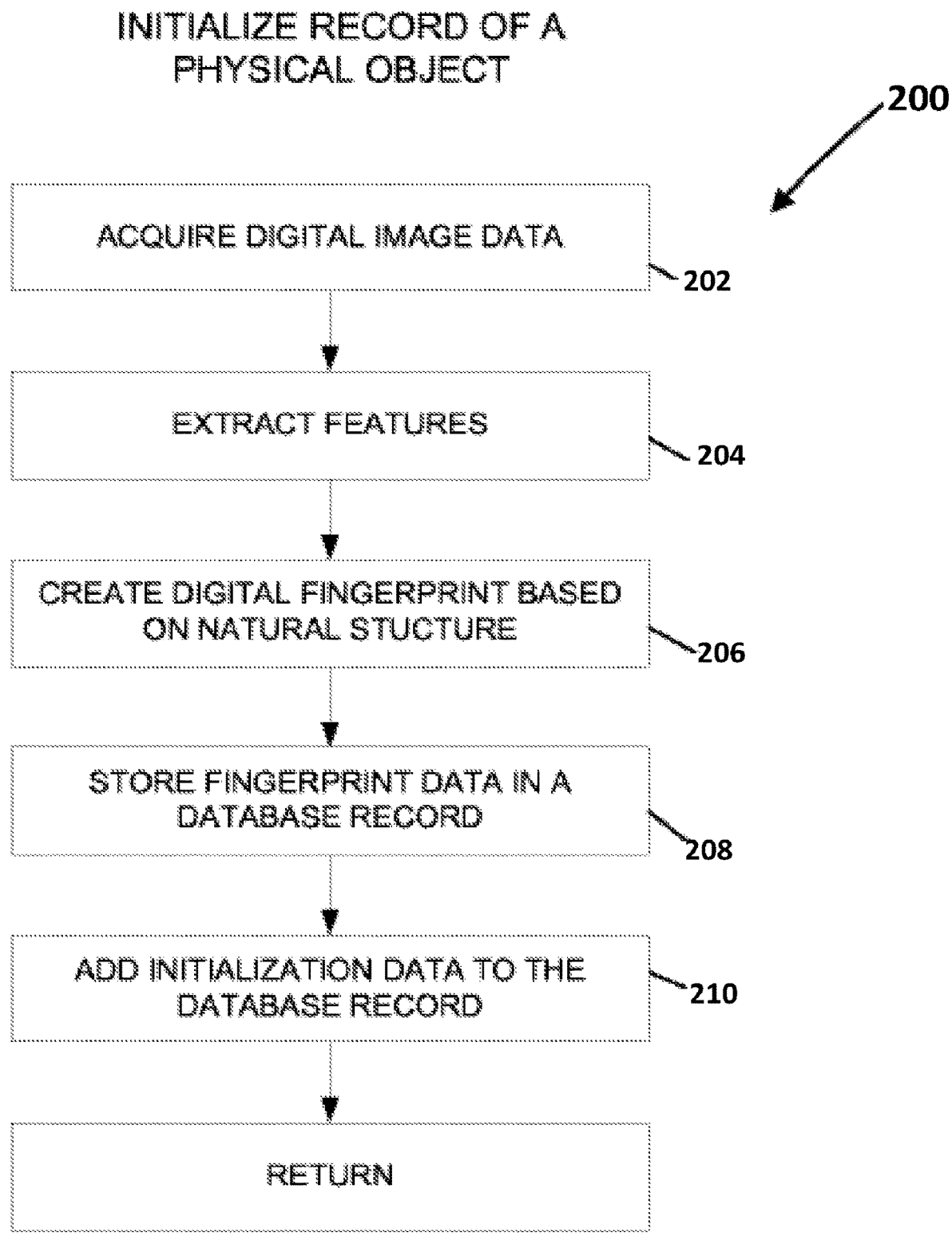
FIGS. 2A and 2B are flowcharts illustrating two methods for generating a digital fingerprint for an object, according to at least one illustrated implementation.

FIG. 2A shows a simplified a method 200 for creating and storing or "registering" a digital fingerprint of an object in a datastore in the form of a database, according to at least one illustrated implementation. The process, in one embodiment, includes acquiring a digital image of the object, block 202, as discussed above. A variety of image capture technologies and devices may be used as noted. Next, features are extracted, block 204, from the digital image data. As explained, specific features or regions of interest (authentication regions) may be selected in support of subsequent identification or authentication of the object. The extracted features are analyzed and feature vectors are extracted to form a digital fingerprint (i.e., a digital file or record) associated with the original image data, indicated at block 206. The digital fingerprint preferably may be stored in a database record at block 208. Other forms of searchable digital data storage should be deemed equivalents. Further, at block 210, initialization data may be added to the database record, or associated with the database record in a related table. This data is associated with the physical object that was scanned. The associated data may include a wide variety of data including, for example, a description, manufacturer, model number, serial number, content, and any other type of data that may be selected as appropriate or useful for a particular type of object.

Figure 2B:
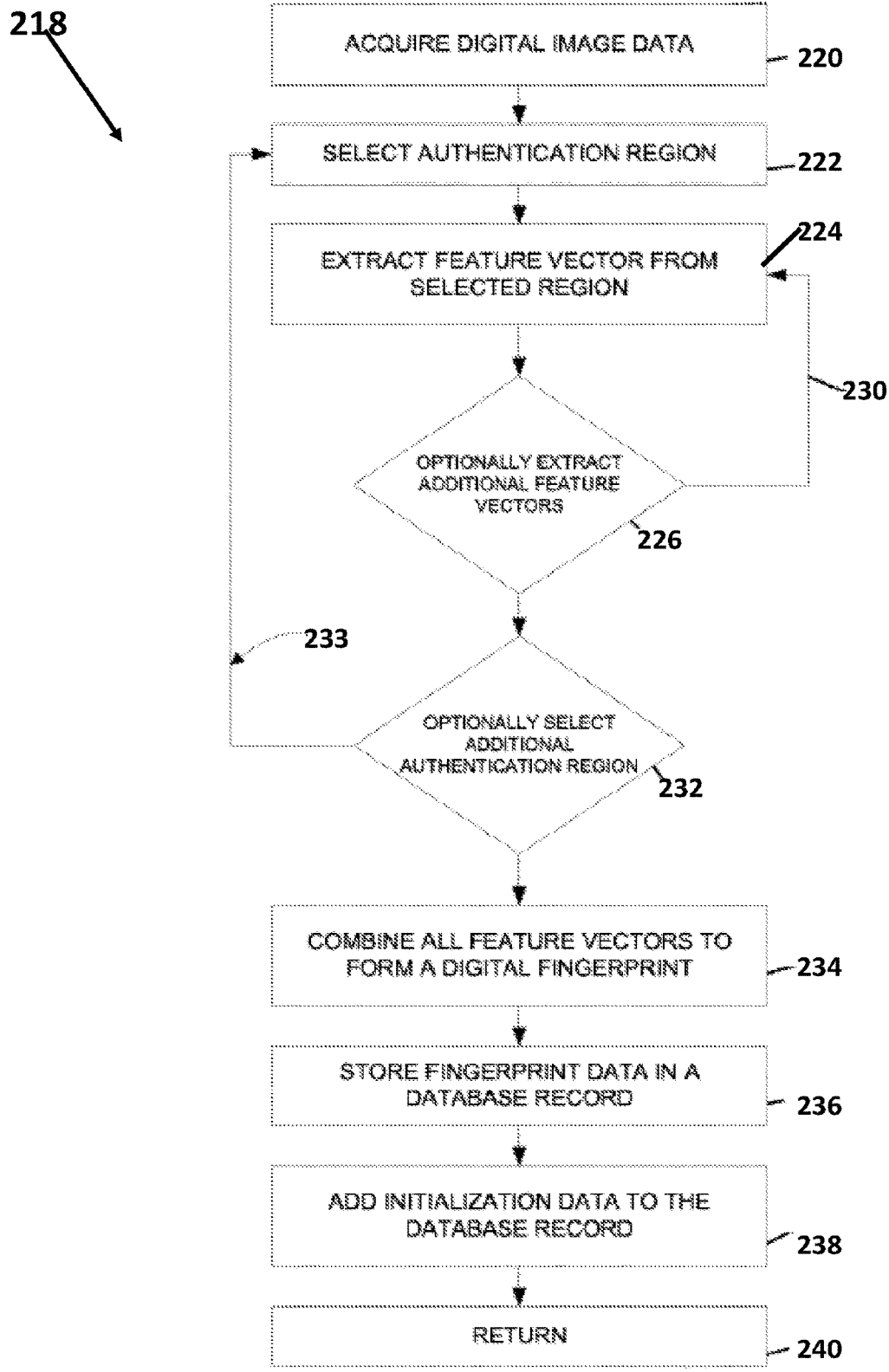

FIG. 2B illustrates a process 218 that includes more robust feature extraction than that illustrated in FIG. 2A, according to at least one illustrated implementation. In this example, the process again begins with acquiring digital image data, block 220. The system selects at least one authentication region, block 222. This may be done by analysis of the image data, analysis of related image data, by reference to a predetermined template that defines at least one authentication region, or other image processing techniques. The system the extracts a feature vector from the selected authentication region, block 224. A feature vector may be used to represent features of a region in a more compact form. For example, a feature vector may comprise an array of color or gray scale numeric values corresponding to areas within the selected authentication region. The values may each comprise a sum, average, maximum or other function of the individual values of a corresponding group of pixels forming a sub-part of the region. In some applications, a feature vector may identify a location and shape of a distinctive aspect within a selected region. The system determines, decision 226, if there are additional feature vectors to be extracted from the same image data. If there are additional feature vectors to be extracted, the control returns, path 230, to repeat the feature extraction, block 224. This loop may repeat until all desired feature vectors are collected. Optionally, the system may determine if there is another authentication region to process in the same image data, see decision 232. If there is another authentication region to process, control is traversed back to block 222 via outer loop 233, for further feature extraction with respect to one or more additional authentication regions.

The system may combine some or all of the extracted feature vectors to form a digital fingerprint, block 234, which the system then causes to be stored, block 236, along with or logically related with related data, block 238, as mentioned above. The process returns or concludes at block 240. Note that the process shown in FIG. 2B may be performed using mixed-mode acquisitions wherein the mixed-mode acquisitions may include, for example, acquiring a video of a face of a person as the person says a password and acquiring a sonogram of a voice of the person as the person says the password and making a single digital fingerprint using all of the data from different data acquisition modes.

Figure 3:
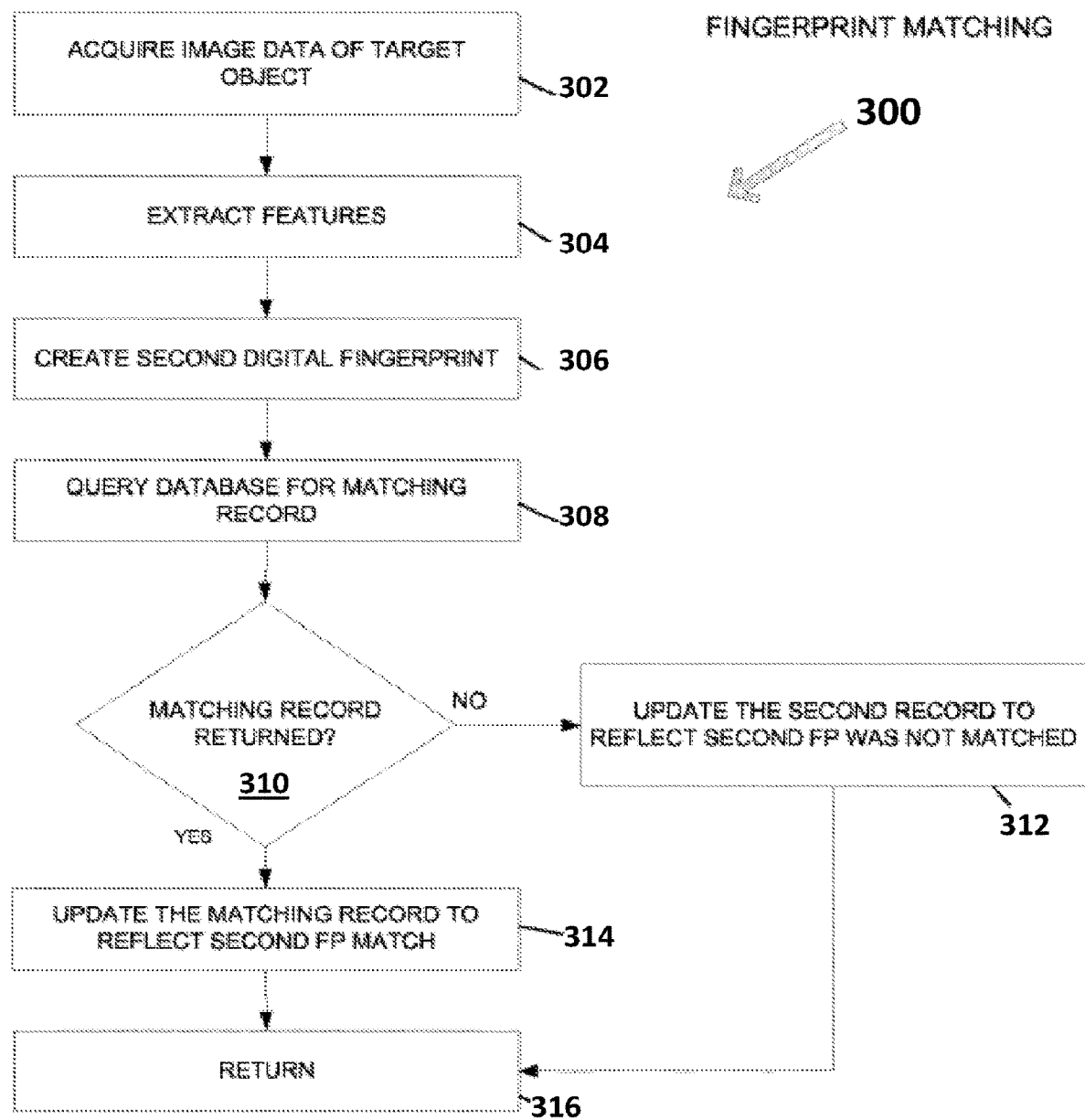
FIG. 3 is a flowchart illustrating a method for matching digital fingerprints that can be improved by a transform pyramiding process, according to at least one illustrated implementation.

FIG. 3 shows a simplified a method 300 for matching a digital fingerprint of a target object to a database of existing or "reference" digital fingerprints, according to at least one illustrated implementation. Here, the system acquires images or image data of a "target object" i.e., the object to be identified and/or authenticated by finding a match in the database, see block 302. The system extracts features from the target object image data, block 304, as discussed above. The system then creates a new (second) digital fingerprint based on the extracted features, block 306. The system the queries the dataset (e.g., database), block 308, for a match, for instance for a record that matches the second digital fingerprint record. "Matching" in this context may be relative to a threshold confidence level rather than a binary decision or to a match confidence level with some other object (e.g., determine that an object is legitimate or authentic when the digital fingerprint for the object matches within a defined tolerance or threshold a digital fingerprint of the reference object (legitimate object). A sample digital fingerprint matching a given reference digital fingerprint may, for example, include sample digital fingerprint matching the given reference digital fingerprint better (e.g., an object that is considerably better) than the sample digital fingerprint matches the reference digital fingerprints of any other object in the dataset). The requisite confidence level may vary depending on the specific application. The confidence level required may be varied dynamically responsive to the data and experience with a given system. If no "matching" record is returned, decision 310, the second record (the digital fingerprint of the target object) may be updated, block 312, to reflect that no match was found. If a match is returned, the matching record may be updated to reflect the match, block 314 (for example, it may be linked to the second record). The results may be returned to the user. The process returns or concludes at block 316. Since each digital fingerprint is complex and the matching process is also computationally intensive, these processes and the overall method 300 in FIG. 3 cannot be performed by a human being nor can these processes and the overall method 300 be effectively performed using pen and paper by a human being. Thus, the method 300 shown in FIG. 3 is a technical process.

As mentioned earlier, a "scan" may refer to an image (or digital data that defines an image) captured by a scanner, a camera, a specially-adapted sensor array such as CCD array, a microscope, a smart phone camera, a video camera, an x-ray machine, or any other device or image sensor that can sense and capture electromagnetic radiation (or any identifying information, e.g., sonar etc., that has traveled through an object, or reflected off of an object, is a candidate to create a "scan" of the object). to the image sensor captures at least one native feature of the object, which may be of an original region of the object as distinguished from a region having a feature added to the object for identification, such as a label, bar code, RFID tag, serial number, etc. In some cases, the native feature may of a non-original region in which an object has been added to the physical object for identification (such as a label). The added object may be affixed (e.g., permanently affixed) to the physical object, such as through an adhesive in the case of a label. So long as the added object (e.g., the label) becomes an integral part of the physical object, the system or image sensor can scan or image the added object to obtain a digital fingerprint and use that digital fingerprint to track the physical object. In some embodiments, the digital fingerprint corresponds to an original region, a non-original region (corresponding to where an object has been added for the purpose of, for instance, identification of the physical object), or combinations thereof.

A "native feature" in this description may not be concerned with reading or recognizing meaningful content, even in the case where the digital fingerprint corresponds to a non-original region. For example, a label on a scanned object with a printed serial number may give rise to various features in fingerprint processing, some of which may become part of a digital fingerprint feature set or vector that is associated with the object. The features may refer to light and dark areas, locations, spacing, ink blobs, etc. This information may refer to or be inherent in the printed serial number on the label (e.g., differences in the way a particular character is printed from object to object), but there is no effort to actually "read" or recognize the printed serial number (which may not be legitimate). In other implementations, this inherent information is used in addition to information represented by the printed serial number. Similarly, an RFID tag applied to an object may give rise to a fingerprint vector responsive to its appearance and location on the object. However, in some examples no effort is made to actually stimulate or "read" data or signals from the tag. In some embodiments the system is not using the added object according to the tracking scheme from which it originated. The various features used in fingerprint processing, some or all of which may become part of a digital fingerprint set or vector that is associated with the physical object, may be extracted from a permanently affixed label (for the purposes presented here the contents of the label, e.g., the value of the serial number may be irrelevant).

As mentioned above, the at least two digital fingerprints of an object that are being matched as shown in FIG. 3 may have been acquired under different conditions which can result in the match failing or taking a longer time than is desirable or permitted for a particular use case. In at least one implementation of the disclosed method(s) using transform pyramiding provides the at least two improvements to the above technical digital fingerprint matching process as discussed below in more detail.

Before describing the transform pyramiding process that improves the matching of the two digital fingerprints, the different types of transforms that may be used in the method are described. These transforms are utilized because, between two acquisitions of an object for digital fingerprinting the object itself, the relationship of the object to the camera, or the object itself between the two acquisitions of the digital fingerprints may have changed. The transforms are used to efficiently match fingerprints of different acquisitions of what may be the same object (and reject fingerprints of other objects) under these circumstances. The term same object in this context means a second or subsequent appearance of a given object as an object in a first or preceding appearance, rather than two different instances of objects of a same type of object. It is important to note that the transforms are complex and that the examples of the transforms and results of the transforms are only examples of the disclosed method(s).

Similarity transforms. The simplest changes in digital fingerprints involve movements of the object (and/or movement of the camera or other image senor) between acquisitions. The resulting changes are translation (the item moves across the field of view of the image sensor but otherwise looks the same), rotation (the item or the camera or other image sensor rotates around the axis between the item and the camera), and uniform scaling (either the object or the camera or other image sensor moves along the line separating them or the camera resolution changes between acquisitions). These can occur separately or in combination. With similarity transforms the object looks the same in both acquisitions. There are four free parameters in similarity transforms: two for translation, one for rotation, and one for scale. These four parameters can be determined by matching two points in each acquisition (i.e., having two match pairs between the acquisitions).

Affine transforms. When a flat object that is relatively far off rotates around an axis perpendicular to the camera-object axis the image undergoes an affine transform. A window seen off-axis from a distance much larger than its size is an example: rectangles are foreshortened or distorted into parallelograms. A similarity transform is, itself, also an affine transform. When one transform includes another as a subset, that transform is characterized as of higher order than the included transform. An affine transform is therefore of higher order than an included similarity transform. The most general affine transform requires determining six free parameters and hence a consistent set of three match pairs between the two acquisitions. These parameters are for translation (two parameters), rotation (two parameters, one for the direction of stretch and the other for rotation of the image), and differential stretch (two parameters).

Homographic transforms. This is sometimes called a planar projective transform. A homographic transform is the distortion seen when a window is viewed off axis from up close. Rectangles are transformed into quadrilaterals. Homographic matching requires determining eight free parameters and hence four match pairs. Affine transforms are subsets of homographic transforms, as are similarity transforms. Briefly, in this discussion of the relationship of affine to homographic transforms lies the kernel of the teachings of this disclosure. Up close, a window seen off axis requires a homographic transform to match the window seen straight on. But as the window moves farther away, the strictly homographic parameters become less and less important until, at a distance much larger than the size of the window, the transform is effectively purely affine. This shows that the homographic transform contains within it a useful but simplified (i.e., requiring fewer parameters) approximation to itself—namely the included affine transform.

Hierarchy of transforms. The above transforms—similarity, affine, and homographic may be viewed as a hierarchy. All similarity transforms are affine transforms, but not all affine transforms are similarities. All affine and similarity transforms are homographic transforms, but not all homographic transforms are either affine or similarity. References to the components of an affine transform, mean those components that apply to all affine transforms. As such, they include the components that also apply to similarity transforms. References, however, to the "strictly affine" components, mean the affine components that are not also similarity components. Likewise, references to "strictly homographic" components, mean those components of a homographic transform that are not also components of an affine or a similarity transform. Thus a rotational transform is a similarity, an affinity, and a homography, while the stretch direction parameter (see above) is "strictly affine" (since similarity transforms have uniform stretching and thus no associated direction) as well as being homographic (but not "strictly homographic"). A transform that turns a rectangle into a general quadrilateral has two non-zero parameters that are "strictly homographic". Thus a homographic transform requires two "strictly homographic" parameters and four affine parameters, while an affine transform required two "strictly affine" parameters and four similarity parameters. Those four similarity parameters (rotation, scale, and two offsets) may be viewed as "strictly similarity" parameters.

The hierarchy of transforms may include a plurality of different transforms as described above. Transforms within the hierarchy of transforms may be differentiated according to the level and/or order of the transform. The level and/or order of the transform within the hierarchy of transforms relate to the mathematical complexity, computational load required to execute, or other characteristic of the transform. For example, lowest level/order transforms may be less computationally expensive to execute than the next level/order transform. Similarly, highest level/order transforms may be the more computationally expensive to execute relative to lower level/order transforms.

In one exemplary embodiment, the hierarchy may be: lowest order is the similarity transform, next higher is the affine transform, next higher still is the homographic transform. However, the transform hierarchy as described above may further include, for example, full perspective transforms and rubber sheet which are done by local transforms joined together as mentioned described above or by using higher-dimensional transform matrices. Thus, the disclosed method is extendible to all locally (and globally) characterizable transform hierarchies. The absence of a particular such transform in this disclosure should not be taken as limiting.

Matching Using Transform Pyramiding

Figure 4:
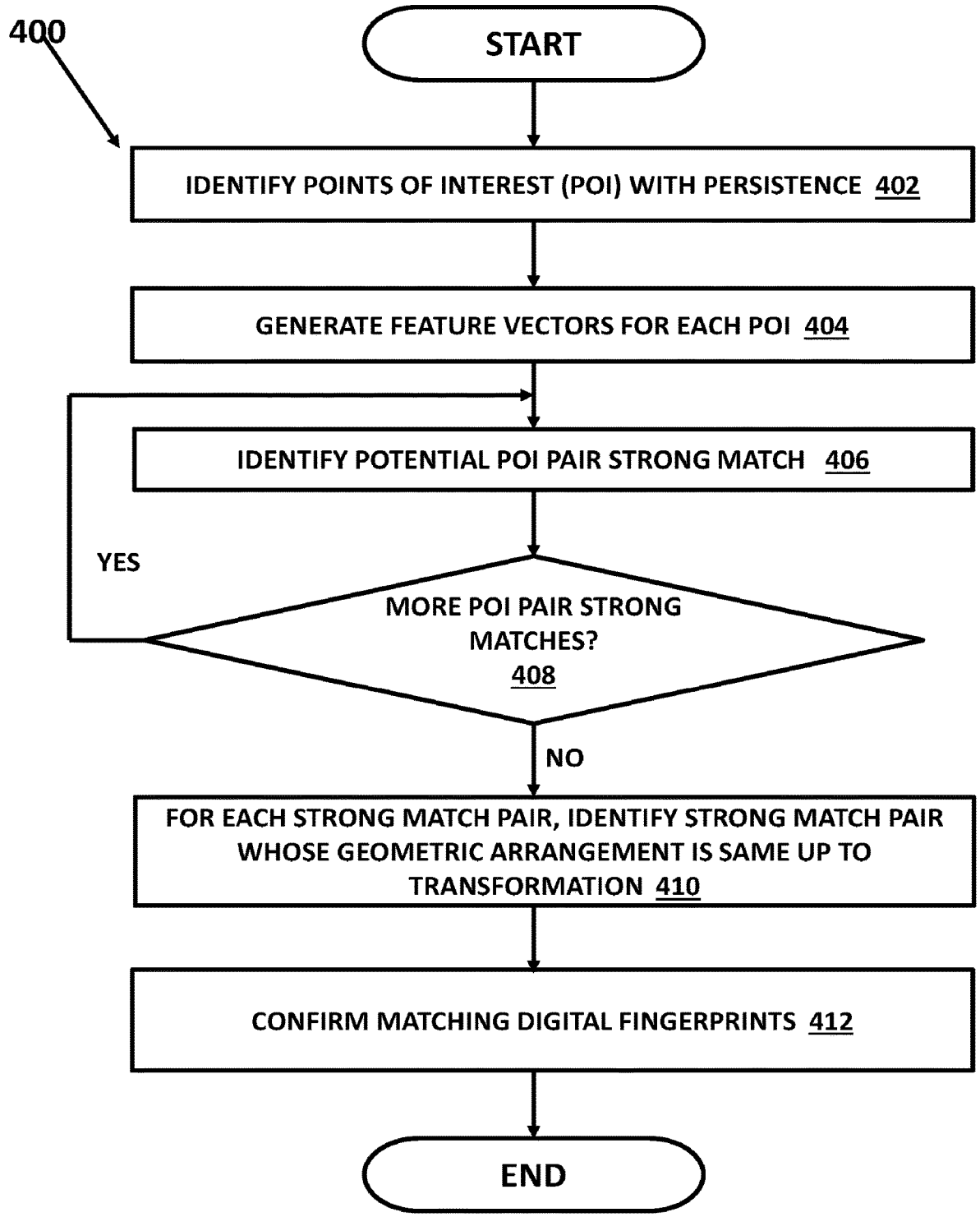
FIG. 4 is a flowchart illustrating a method for matching using a transform pyramiding technique, according to at least one illustrated implementation.

FIG. 4 shows a method 400 for matching using a transform pyramiding technique, according to at least one illustrated implementation, that is a technical process that improves in a technical manner the digital fingerprint matching process shown in FIG. 3 and described above. The matching of two digital fingerprints using the method in FIG. 4 can be used to authenticate an object if the two digital fingerprints are matched. FIG. 4 illustrates an example of the method and the processes in the method can be varied. For example, FIG. 4 suggests that a same set of points of interest in each digital fingerprint are used for determining the transform being used (see below for more detail) and whether the digital fingerprints match. However, using one set of points of interest to determine the image transform and another set of points of interest to perform the matching is within the scope of the disclosure. It should also be understood that the transforms discussed here can be applied to the images or applied to the position coordinates of the points of interest. All these considerations and others known in the art are within the scope of the disclosure.

To achieve the greatest certainty of identifying the correct object with the two digital fingerprints, the method finds the largest number of true matches (or pairs of points of interest) between the two acquisitions of the correct object while, at the same time, finding as few as possible with any wrong reference object. To get as many matches as possible, the method ensures that the matching areas on the test and reference objects cover the object as completely as possible. This, in turn as discussed above, requires finding the correct transform between the two acquisitions of the object (one being tested and one in the reference set) that is performed using the method shown in FIG. 5 and discussed below.

As shown in FIG. 4, the matching process 400 may begin by finding points of interest in each digital fingerprint that are believed to have "persistence" (402), that is, to have a high likelihood of being present and in approximately the same position (up to an allowed transform) in multiple acquisitions of the object even under the different conditions. Various processes, including for example conventional image processing processes, may be employed to determine the points of interest. For example, light-colored blobs on a dark background, dark blobs on a light background, corners and intersecting lines, as well as line segment ends are examples of features that are often both persistent between two acquisitions of the object and easy to localize in the image. On the other hand, lines may be persistent, but finding identifiable points along the lines is likely to be difficult or impossible. Regions of uniform color are often not localizable (except perhaps at their edges and corners) at all. There are several methods for distinguishing persistent and localizable locations from others, such as finding places in the image where the determinant of the local Hessian matrix of the image is extremal and its eigenvalues are large and of the same sign. Such points are likely persistent (as indicated by the large determinant) and localizable (as indicated by the eigenvalues being comparable in size and of the same sign).

The different conditions result in distortions of the image or of the object that take place between the two image acquisitions. As a result, a digital fingerprint generated from each acquired image may be different. Each digital fingerprint generated from each acquired image comprises feature vectors of these points of interest and may contain their locations, their orientations, and other information about the point of interest or object that is generated (404). Thus, the matching of "digital fingerprints" involves matching the feature vectors of points of interest (finding "strong matches") and matching both the feature vectors and the location parameters (and or other such features) of the points of interest (finding "true matches"). The matching may be performed when the first and second set of points of interest are similar wherein similar means that the feature vector for each of the two sets of points of interest are close to each other in which various known metrics may be used to determine the closeness of the feature vectors. Where there is significant distortion, persistent points of interest may not be in the same locations in the two digital fingerprints. It is toward matching digital fingerprints in the presence of such distortions that the current disclosure is directed. While this disclosure concentrates on transform pyramiding using the positions of points of interest, it will be understood by those familiar with the art that such techniques are extensible to other parameters, in particular to point of interest orientation.

Once the points of interest are found and characterized by their feature vectors, matching consists of finding points of interest in one acquisition that correspond to points of interest in another. In general, the more points of interest in the two digital fingerprints that match, the more likely the two digital fingerprints come from the same object. This matching first determines/identifies a point of interest pair (one from each acquisition) that is considered a "strong match" (406) when their feature vectors match to within some threshold. When two points of interest match their feature vectors closely enough to be strong matches, they form a potential match pair. They are only "potential" until they pass the next test. A "strong match" between two points of interest occurs when, for example, the vector distance between the two point of interest characterizations falls below a potentially adjustable threshold. More than one point of interest pair strong match may be identified (408). To identify additional point of interest pair strong matches, points of interest within the digital fingerprint may be matched to form a potential match pair and each potential match pair may be evaluated using the "strong match" test above.

The matching process may then find sets of strong match point pairs whose geometric arrangement on the two objects is the same "up to" some transform (410). The term "up to" is a term of art from mathematics. In the case at hand, saying that the two members of a match pair are in the same position on their respective acquired images "up to" the allowed transform which means that, if the transform is applied to a set of such points in one acquisition, those points will now match (to within some tolerance) the actual positions of the other member of their pair in the other acquisition. Strong match pairs that meet this criterion are called "true matches". Often there are, for at least a subset of the strong matches, multiple possible geometric arrangements and transforms that would be consistent for at least that subset of points. The chosen geometric arrangement and associated transform is typically that which produces the largest set of true matches over the object, covers the greatest fraction of the object, or some combination of the two. The primary use of the transform pyramid disclosed here is to create the largest set of true matches between the two digital fingerprints in an efficient manner. Typically, the better the actual transform is characterized, the larger the number of true matches that results and the larger fraction of the object images are matched.

Figure 5:
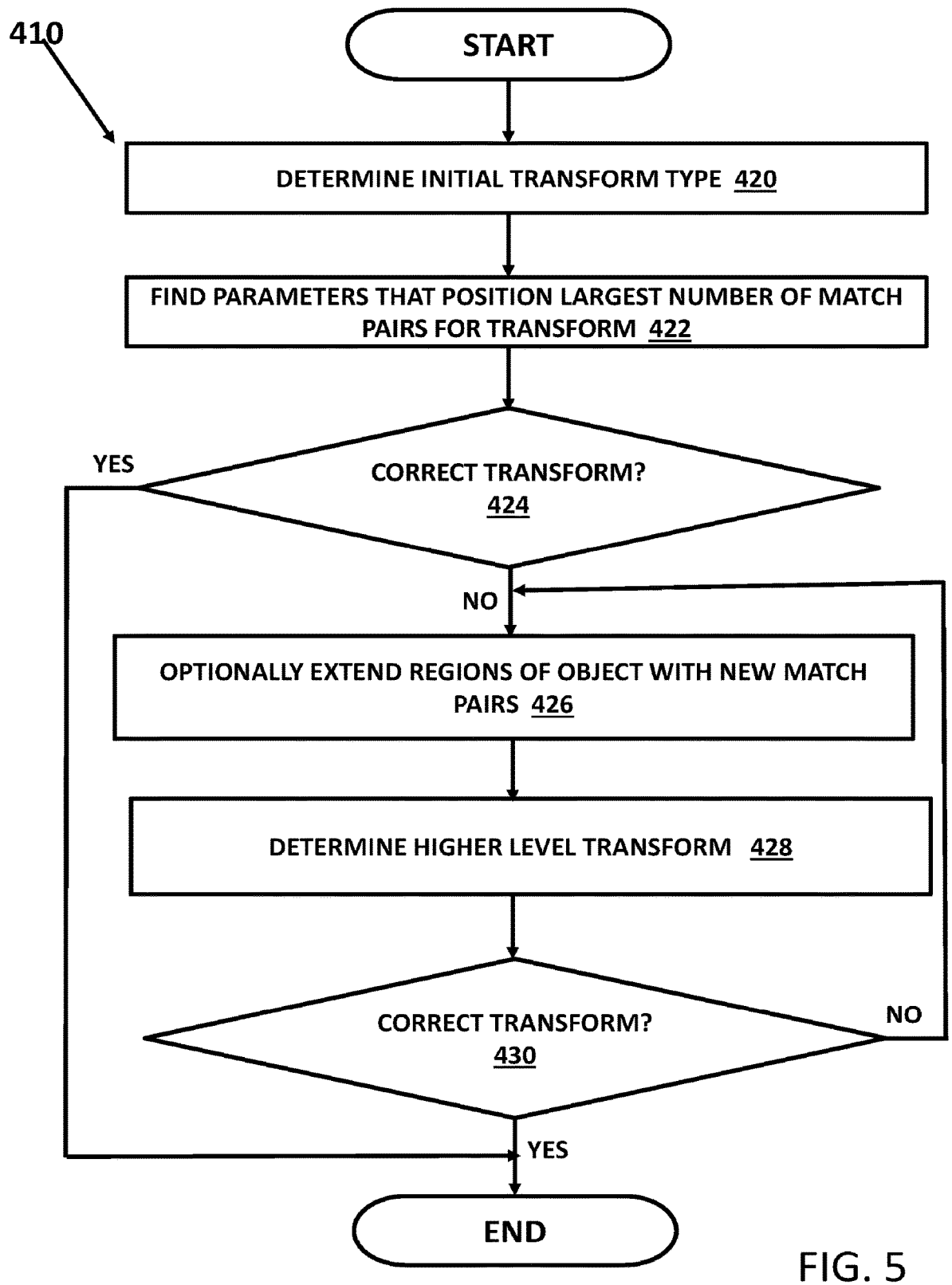
FIG. 5 is a flowchart illustrating more details of the geometric arrangement process of the transform pyramiding technique, according to at least one illustrated implementation.

To determine which match pairs meet the geometric constraints, the system determines (at least approximately) the transform between the two acquisitions so that the system can morph the locations of one member of each pair to the position of the other in its acquisition as is discussed in more detail in FIG. 5. In general, the better the estimate of the transform, the larger number of true matches will be found and the more of the object will be covered. Notice that to find the transform, the system finds matching point pairs and to find matching point pairs they system employs the transform, at least approximately. There are many techniques known in the field for boot-strapping this process. RANSAC (Random Sample Consensus) works well for most of the processes disclosed here. RANSAC randomly chooses a set of strong match pairs in the two acquisitions, determines the transform required to make those true matches, and then determines the number of total point pairs matched using that transform. The "best" transform is the one that has the greatest number of "inliers", that is, point pairs that match up to the chosen transform. If the matching method finds sufficient true matches between the two digital fingerprints, then the two digital fingerprints are found to be matching (412) despite the different conditions that required the transform pyramiding technique to be used. More details of the conditions requiring the transform pyramiding technique to be used are disclosed in FIG. 5. In general, the more extreme the distortion between the two acquisitions, the higher order the transform needed to maximize the true matches.

FIG. 5 shows a method, according to at least one illustrated implementation, that illustrates more details of the geometric arrangement process (410) of the transform pyramiding technique. Both the method shown in FIG. 4 and the method shown in FIG. 5 may be implemented in a computer or a computing device with one or more processors that execute a plurality of lines of instructions (processor-executable instructions) that configure the processor and/or may be implemented in a hardware device, such as one or more application specific integrated circuits (ASICs), microprocessors, central processing units (CPUs), graphics processing units (GPUs), digital signal processors (DSPs), neural processing units (NPUs), state machines, the server 110 in FIG. 1, etc. that performs the processes shown in FIGS. 4 and 5.

In general, the process shown in FIG. 5 finds a lowest-order transform that applies over the entire image. The process may find that transform using the smallest possible regions on the object. The larger the area used to determine the parameters, the more accurately those parameters can be determined, the more accurately the process can determine what kind of transform exists between the two acquisitions, but also the longer it takes to determine the transform. In general, the higher the order of the overall transform, the smaller the regions that can be matched by a lower-order transform and the more the characterizing parameters of such low-order transforms of the matching regions differ in different regions across the object. Determining the correct size over which to look for matching points is a multi-act process that greatly speeds up matching as described below in detail.

As shown in FIG. 5, the method determines the correct transform (430) and does not initially know the correct transform, but can often know some things about the correct transform. If, for example, the method is trying to match objects in which the objects were captured as identical objects carefully placed in a rig, there may be no transform at all—the objects are already sufficiently well aligned. If, on the other hand, the object is captured with a hand-held camera and if the object itself can change between acquisitions (for example, a face), then the real transform may be rubber sheet transform and only small regions can be directly matched by lower-order transforms. In general, the better the attempted transform matches the actual transform, the larger the fraction of the object that will be successfully matched to within some tolerance. If the actual transform is higher-order than any of the attempted matching transforms, the entire object generally cannot be matched using the same set of (lower-order) parameters to within an acceptable positional tolerance. In that case, we find multiple such regions that match between the two acquisitions and patch them together across the object to get the overall match. Some example methods for so doing are outlined below.

The geometric arrangement process is used to determine the true match pairs and the transform between them and it is an iterative process as shown in FIG. 5. As shown in FIG. 5, the process starts by determining an initial transform type (420) to be applied to the match pairs and estimate the transform, using a lowest-order transform (an example of which is similarity transform) consistent with what is known of the acquisition setups. In some embodiments, the choice of the initial transform may depend on what is known about the distortions that may have occurred in either the object or the images between the acquisitions. For a reasonably rigid object imaged from a consistent position (such as a machine part for example), the initial choice of transform would be the simplest—a similarity transform. Where the object is rigid but free to rotate out of the plane of view, an affine transform would typically be chosen if the object is relatively far away and an homographic transform chosen if the object is relatively close. If little or nothing is known of the potential distortions, the method would typically start with a similarity transform. Thus, the method chooses the initial transform from the setup as well as the potential changes in acquisition conditions and object conditions that can take place between acquisitions.

Figure 6:
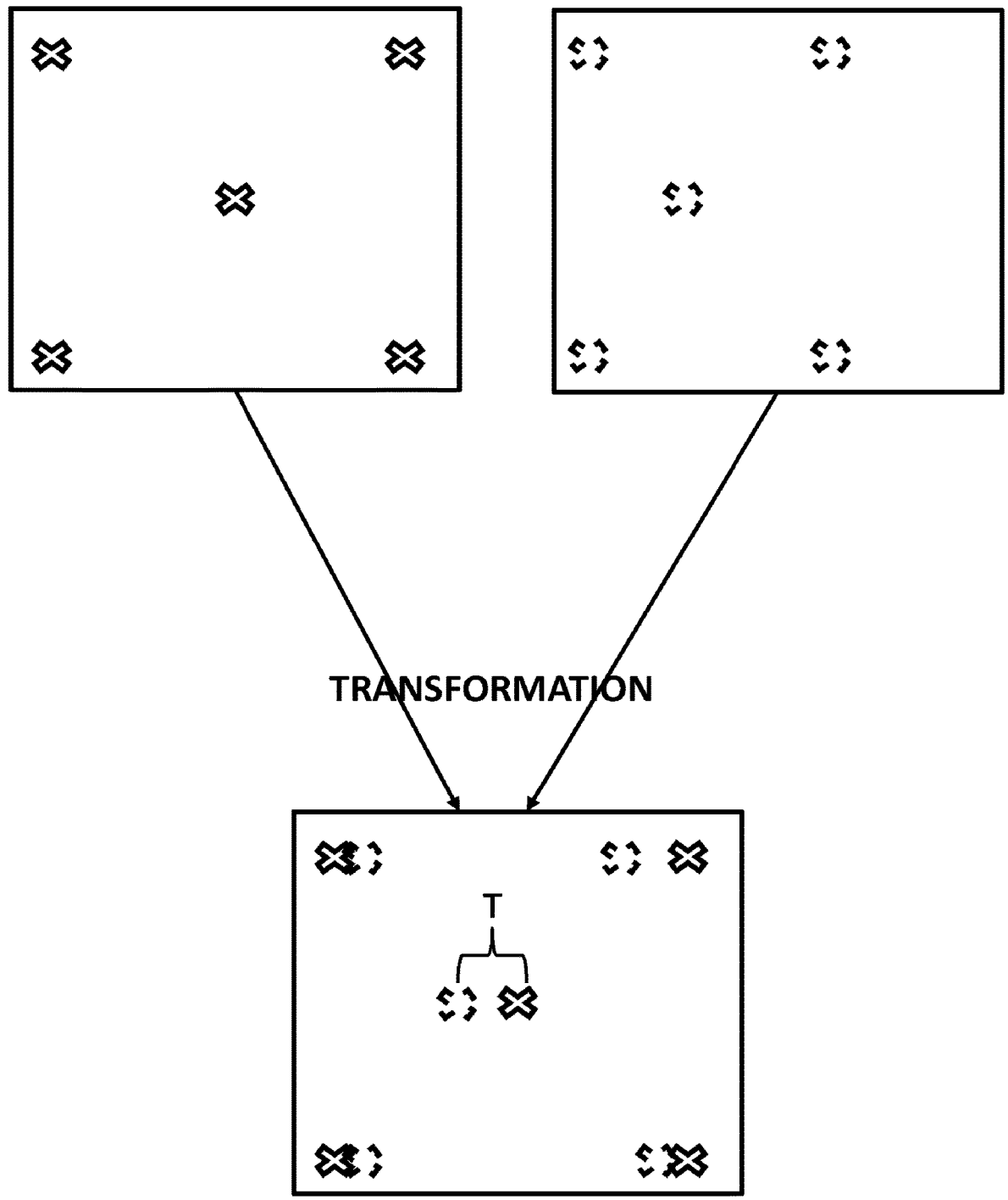
FIG. 6 is a schematic diagram that illustrates an example of match points in two digital fingerprints being transformed as part of the geometric arrangement process in which a correct transform was used, according to at least one illustrated implementation.

The initial transform may be applied to as large a region of the object as possible. A "region" is defined as an area (volume for higher-dimensional digital fingerprints) where the match pairs are in the same geometric relationship in both acquisitions up to some threshold and the method may find the transform parameters (422) that correctly locate the largest set of true match pairs in the two fingerprints within some tolerance, T, as shown in FIG. 6. The tolerance range depends on knowledge of the deformability of the object and the known differences in acquisition conditions. For example, something like a hard-sided bag imaged perpendicularly would have a very small tolerance (typically on the order of a millimeter), a fabric bag a larger tolerance (perhaps a half a centimeter), and a duffle bag an even higher tolerance (perhaps a centimeter or more).

Typically when finding the lowest order transform as the pyramiding process is started, the system may choose a relatively large tolerance (in order to get sufficient true matches to proceed to the next act in the pyramiding) and lower the tolerance for each higher-order transform. For example, for a rigid object where the change from one acquisition to the other is moderately homographic, it is likely that a similarity transform would find true match pairs over the entire object but only by using very large positional tolerances. Alternatively, if the method used a tighter tolerance, only a portion of the object would match. If the method uses an affine transform, the tolerance to cover the entire object would likely be much smaller than that for a similarity transform, but still too large to be desirable. When the homography stage of the pyramid is reached, a tight tolerance can be applied to point location (since the transform actually is homographic).

Figure 7:
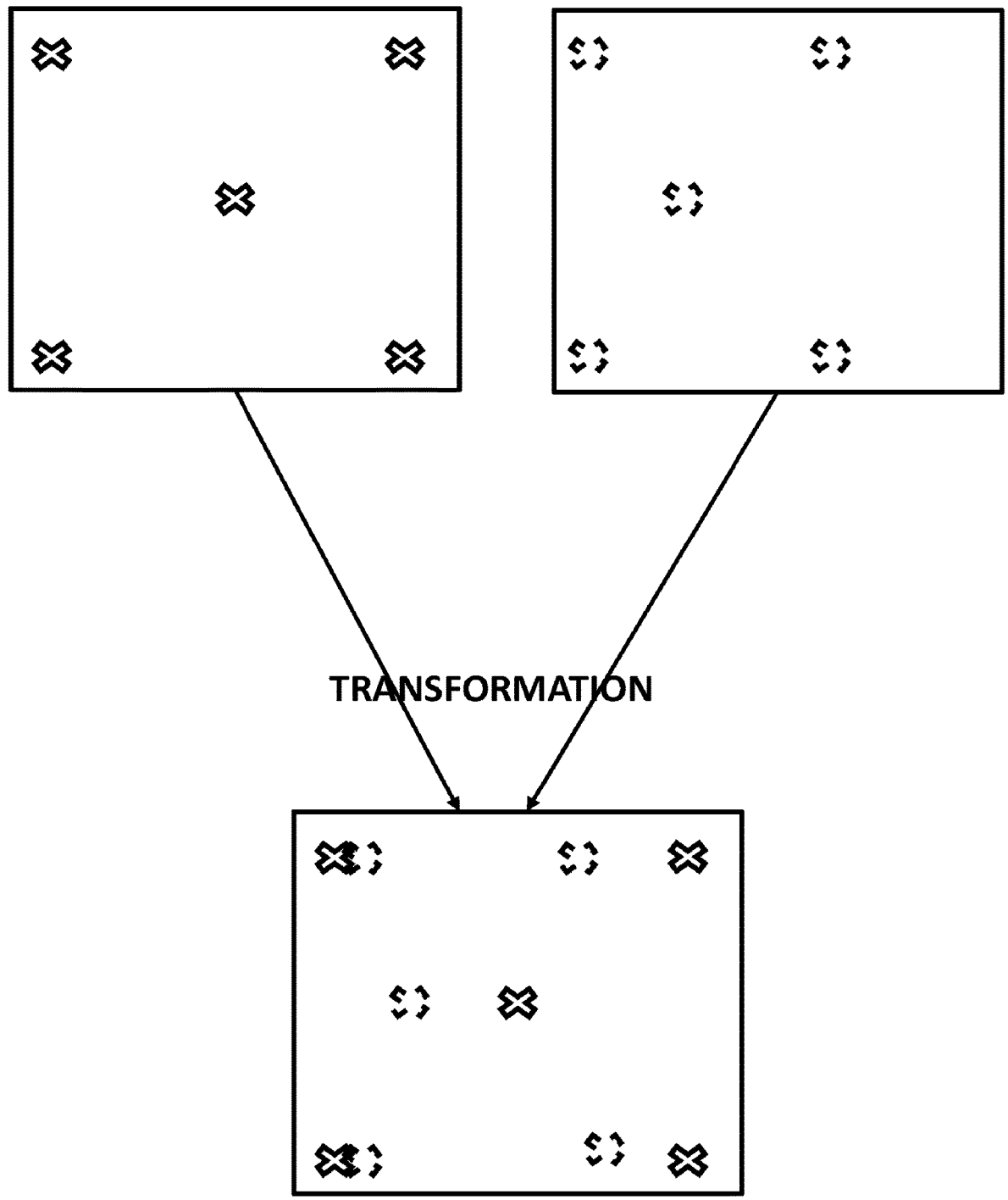
FIG. 7 is a schematic diagram that illustrates an example of match points in two digital fingerprints being transformed as part of the geometric arrangement process in which an incorrect transform was used, according to at least one illustrated implementation.

Returning to FIG. 4, if the chosen transform is the correct (process 424) one (and if the two digital fingerprints are of the same object), it is likely that match pairs covering a large portion of two digital fingerprints will be found as shown in the example in FIG. 6. If the chosen transform is of too low an order (even when comparing two acquisitions of the same object), it is likely that matches to within the specified tolerance will exist only over a limited region of the object as shown in FIG. 7. In the method, a choice of transform is of too low an order when it does not allow for the deformation between acquisitions that actually takes place. Thus, if the actual deformation is affine, a similarity transform is of too low an order to provide true match pairs across the entire object without unacceptably large match position tolerances. Similarly, if the actual transform is homographic, neither a similarity nor an affine transform will allow such matching (again, without unacceptable large match position tolerances). It is likely that the affine approximation will match a larger proportion of the object than the similarity (that is, after all, the point of the pyramiding process) but still not enough to within acceptable tolerances. There may, indeed, be many such matching regions, potentially each with its own set of transform parameters and the method may optionally extend regions of the object with new match pairs (426) as discussed below in more detail.

Once such regions have been found, the method may find more matching point pairs in or near the local region (426) and using them (along with those already found) to raise the order of the transform by selecting point pairs from the new set and using them to find the parameters of a higher-order transform (428) that allows matching to closer positional tolerance. Since the method is only using the point pairs already found using the lower-order transform, selecting point pairs for the higher-order transform becomes much quicker than if it were choosing potential match pairs from all over the object. This speeds up the process, providing an important improvement to the matching process as discussed above.

As an example, suppose that in the full matched point pair candidates the percentage of spurious matches is 99% (a very common situation). The probability of selecting 4 pairs (as is required for finding the parameters of a homographic transform) from this collection that are not spurious—that is, that actually demonstrate the correct transform—will be one chance in one hundred million ($0.01^4$). For the correct transform parameters to stand out from random, RANSAC (and other filtering mechanisms) would require a very large amount of computer resources, if it were possible at all. On the other hand, selecting the two matching pairs required for a similarity transform is one chance in 10,000 ($0.01^\wedge 2$), and will succeed 10,000 times faster.

After finding the largest set of matching points (and their associated parameters), using the new pool of points (instead of points from the entire object) speeds up the process of going to higher-order transforms in two important ways. First, there is a much smaller candidate set from which to choose the matching pair candidates (the newly-found set of matching points). Second, and generally even more important, practically all the matched pairs we have found will also be matched pairs for the higher-order transform and the RANSAC search for the higher-order parameters will be essentially instantaneous.

Once the higher-order transform is found and its regions of match determined, those regions are in turn expanded and the process continued (looping back to process 426) until the regions can no longer be expanded or until enough of the object is matched. If the method runs out of easily parameterizable transforms and the matched regions are still too small, the process may link matched regions as described in more detail below so as to cover more of the object.

In general, the smaller (in absolute value) the higher-order parameters, the larger region over which the lower-order transform (which has those higher-order parameters set to zero) can approximate the true transform to within acceptable tolerance. The reason for this is that under such circumstances, the lower-order transform is a better approximation of the higher-order transform. Experience teaches that with physically-realizable objects the lower order transforms are generally good at characterizing significant regions of the object and parameters of higher order transforms are generally smaller and less important than the parameters of the lowest-order transform for excellent physical reasons. Consider going from a similarity to an affine transform. The affine transform requires two more parameters than the similarity. The added parameters describe the differential stretch, one for the direction of the primary stretch and one for the difference between the two stretches. The angle of greatest stretch is only important if the two stretches are significantly different. And while they can differ substantially (primarily from off-axis viewing), they are rarely very large compared to the overall scale of the object images. Viewing a flat object from a 45 degree of-axis point of view only produces a differential stretch of about 30%, for example. The same argument can be made concerning the strictly homographic components. As mentioned elsewhere in this description, strictly homographic parameters become useful when the object is seen close up (and is, for example, rotated perpendicular to the viewing axis). Unless the object is viewed from a distance much smaller than the size of the object, the strictly homographic components are small compared to unity. And if it is viewed from that close, it is likely to be impossible to image the entire object clearly in the first place.

The taught method thus increases the size of the matched region(s) until, ideally, a single transform allows matching across the entire object. If it does not, it still gives the largest possible regions to combine to get the overall match. This last will take place when the actual transform is of too high an order (such as rubber sheet), or when trying to match the wrong object. It will generally be an indication of an attempt to match the wrong object if the initial transform approximation produces a very small number of true matches and when higher-order transforms do not much improve the matching.

In the method shown in FIG. 5, there are two considerations that cause the number of potential true match pairs that must be evaluated to grow very large. First, the higher-order the transform, the more match pairs are to be found to form a potential set of overall parameters. For example, two match pairs are sufficient to enable the parameters of a similarity transform to be determined, three are required for affinity, and four for homography. Since using standard techniques, candidate match pairs are chosen more or less at random, over regions of the same size determining the most likely pairings becomes exponentially more difficult with the higher order the transform being characterized. Second, the larger the area on the acquisitions from which potential true match candidates come, the more potential match pairs will be evaluated and the more likely that they are to be spurious (i.e., be strong match pairs that are not true match pairs). For the transforms discussed above, the number of actual true match pairs needed to specify the transform goes from two to three to four as we move from similarity to affinity to homography. Meanwhile the number of potential true match pairs grows geometrically with the area of the regions from which they are chosen. Because both of these slow down the match process and because the increasing number of spurious matches that occur increase the likelihood of a match with the wrong object, the method first limits the order of the transform and, once having done that, limits the area from which potential match pairs to be tested come from as the method raises the order of the determined transform.

The matching process with transform pyramiding may limit the region size over which to choose the match points and use the lowest-order transform possible to characterize their geometric relationship. However, the region size for the method may have a minimum size and a maximum size. If the region from which matching point pairs are selected is too small, uncertainty in point of interest positions will limit the accuracy of the determined transform parameters and increase the number of regions that need to be linked to match enough of the object. On the other hand, the smaller the match region size, the faster the process of determining the parameters characterizing the transform for that region. If, on the other hand, the attempted matching regions are too large and the true transform is relatively high order, it may be impossible to find lower-order parameters that adequately characterize the transform. Further, the larger the region sizes are, the more candidate match point pairs need to be tested to determine the set of parameters that stand out.

The region size is highly dependent on the actual transform between the two acquisitions and by how well it is approximated by the lower-order transforms. If the two images differ only by rotation and a small offset, then it is likely that most of the object can be used for selecting candidate match pairs. This is because a similarity transform applies to the entire image (absent the parts translation takes out of sight). If, on the other hand, the true transform is affine, the maximum region size found by a similarity transform (where matches are within positional tolerance), will likely be considerably smaller than the entire region. The larger the strictly affine parameters are (that is, the more the actual transform differs from a similarity transform), the smaller will be the regions adequately characterized by a similarity transform.

Figure 8A:
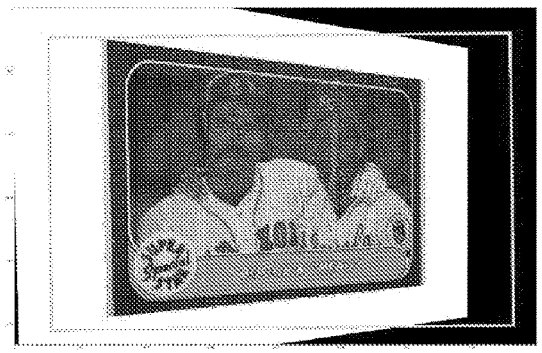
FIGS. 8A-8C are images of an object that illustrate an example of the transform pyramiding process, according to at least one illustrated implementation.
Figure 8A:
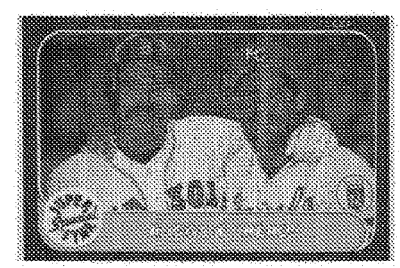
Figure 8B:
Figure 8B:
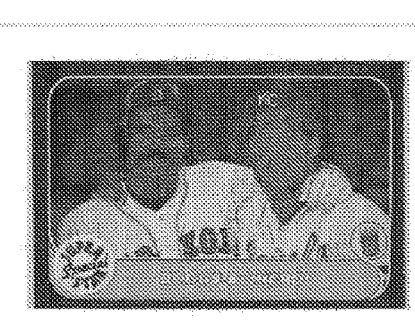
Figure 8C:
Figure 8C:
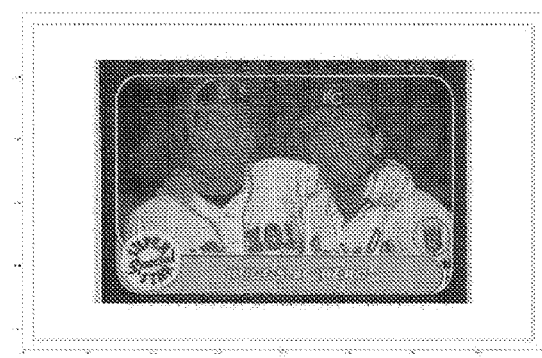

FIGS. 8A, 8B, and 8C illustrate an example of the transform pyramiding process, according to at least one illustrated implementation. In this example, images of the same object has been captured in two different conditions in which a first captured image 800 of the object, a baseball card, is captured 30 degrees off axis to the left and slightly downwards while a second captured image 802 of the object is captured from a camera looking straight down at the object. In each of the figures, the strong match points of interest are indicated by blue dots are and the best similarity transform indicated by red dots. FIG. 8A shows the results of the similarity transform. The method uses the similarity true matches to form the set from which the system chooses the best affine transform (the next-higher transform) which speeds up the process as described. FIG. 8B shows the result of the affine transform matching in which a much larger area of the object is covered by true matches, but still not enough to adequately cover the object. The fact that more area is covered indicates the process is are moving in the right direction and the fact that it still is not adequate indicates the actual transform is of higher order than affinity. The red dots in FIG. 8B are then used to choose the best homography transform (the next-higher transform) which speeds up the process as described. As shown in FIG. 8C, the true matches of the homography transform cover the entire object, indicating that the transform pyramiding method has found the actual transform. As shown in FIGS. 8A-8C, the progression of the true matches from the similarity→affine→homography transforms are shown and the similarity transform approximates the affine transform and the affine transform approximates the homographic transform.

In an alternative embodiment, if the method cannot determine the correct transform for the digital fingerprints, but it is still desirable to limit region size (to cut down on the number of candidate match pairs), the method can limit the points of interest in one acquisition (and one digital fingerprint), but not limit the points of interest in the other acquisition and digital fingerprint (using an asymmetric match point selection process.) In other words, in the method, a small patch of points of interest in one acquisition of the object may be used to look for a matching region across the entire other acquisition of the object. If, on the other hand, it is known that there is little translation (and even better if the higher-order parameters are also believed to be fairly small), the method may be able a priori to determine the alignment of the regions that should match (if the two acquisitions are from the same object) and hence limit region size in both acquisitions. Any such limitations decrease the number of point pairs that must be tried and hence speeds up the entire matching process.

Details of the Methods

The systems and methods disclosed extend to all physically-realizable transforms between two acquisitions of objects (and thus two digital fingerprints acquired under possibly different conditions). For purposes of illustrating the details of the methods, conditions of the two acquisitions where the higher-order transform is homographic (also known as a full planar projective transform) is used. If the object is planar and does not itself warp, a homographic transform is adequate regardless of the displacement or rotation of the object relative to the camera or other image sensor.

In the method, it is not required that the lower-order parameters be exactly the same as their higher-order equivalents would be if the actual transform were known. As described above, however, having physically-realizable objects and physically-realizable imaging keeps the two acquisitions "close enough" that the approach is useful. Using the method, for example, viewing an object "from the side" will distort the image significantly (by foreshortening it in the direction in which the camera is off-axis from perpendicular to the object), but not distorted enough that regions of useful size cannot be found assuming the transform is similarity or affine instead of homographic.

If the object is inherently three-dimensional, the actual transform is likely perspective or full projective, but large regions typically can still be matched using homography. If not, the method disclosed may be easily extensible to higher-dimensional transforms involving, for example, points of interest distributed in three dimensions. If the object is also malleable (i.e., if it moves or changes shape during acquisitions) then the points of interest are distributed in four dimensions. All such approaches are within the scope of this disclosure, as are such transforms as perspective and full projective that require even more parameters than homographic.

In the illustrative example with the homographic transform in two dimensions, the general equation for a homographic transform is:

$$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x \\ y \\ 1 \end{bmatrix} \qquad \text{Eq. 1}$$

This equation is written in homogeneous coordinates, which enables all the components (and in particular the translation parameters) to be put into a single matrix equation. This appears to require determining nine free parameters but because the same point in standard coordinates is represented by any (non-zero) multiple of its representation in homogeneous coordinate, there is one fewer free parameter. Conventionally $h_{33}$ is set to 1 without loss of generality. This means the above equation can be written $$\vec{x}' = \begin{bmatrix} A & \vec{t} \\ \vec{v}^T & 1 \end{bmatrix} \vec{x} \qquad \text{Eq. 2}$$

where A is a 2×2 matrix containing the four strictly affine parameters, $\vec{t}$ contains the t translation parameters, and contains the two $\vec{v}^T$ strictly homographic parameters.

Parameter selection. Because similarity is characterized by four parameters, it two match pairs are used to determine those parameters. Because affinity uses six parameters, in particular three match pairs, and because full homography employs determining eight parameters, in particular four match pairs. RANSAC and other methods for finding the parameters operate by selecting n strong match pairs from the two acquisitions' digital fingerprints and calculating the parameters for the candidate transform from them. For similarity n=2, for affinity n=3, and for homography n=4. Once the parameters from this set of match pairs are calculated, another n points are selected. This is done many times, with the parameter set determined each time. Finally, the set that appears most often is selected as the true similarity, affinity, or homography (depending on the order chosen for the candidate transform). Although there are numerous ways to filter the selection set (some of which are explicitly taught in this patent and others which are well known in the art), the number of selections that must be made (and hence the time it takes to execute the algorithm) goes up roughly exponentially with the n. To optimize performance, the system may limits the size of the selection set or the number needed in each selection, or both. This disclosure describes how to do that by solving for the parameters of the low order transforms first and using them to limit the search for the higher-order transform parameters.

Similarity. The method starts by seeking regions matched adequately (within a positional tolerance) by a similarity transform. The general homography equation parameterizes rotations and stretch (whether uniform or not) in A, translation in $\vec{t}$ "Strictly homographic" (as distinct from affine components that are homographic only by courtesy of all affine transforms being subsets of homographic transforms) terms are therefore in $\vec{v}^T$. This division is not, however, optimal for the transform pyramiding taught here because the goal is to move from similarity to affinity to homography and some of the similarity parameters (uniform scale and rotation) are in A while others are in the translation. The method therefore starts by including in A only those terms that are from similarity transforms.

$$\begin{bmatrix} x' \\ y' \\ 1 \end{bmatrix} = \begin{bmatrix} s\cos(\theta) & -s\sin(\theta) & h_{13} \\ s\sin(\theta) & s\cos(\theta) & h_{23} \\ 0 & 0 & 1 \end{bmatrix} \begin{bmatrix} x \\ y \\ 1 \end{bmatrix} \qquad \text{Eq. 3}$$

Equation 3 is the most general similarity transform. It has four free parameters: the uniform scaling (s) difference between the two acquisitions, the rotation angle ($\theta$) between their two viewpoints, and the two components of the translation vector ($h_{13}$ and $h_{23}$) between the two acquisitions. Determining these four free parameters require two points be matched between the two acquisitions.

If a transform of lower order than the "true" transform is chosen, the transformed points will be in the wrong place by some amount. The lower-order transform is adequate to describe any region over which the error caused by choosing the wrong transform order is smaller than the position tolerance over which two points are considered to match. This determines region size and is clearly dependent on that tolerance and on how much the chosen transform differs from the actual transform.

For example, consider what happens when the true transform is affine, but the method seeks to model it using a similarity. For simplicity in this explanation, the translation terms are dropped. Because the "true" transform is affine, there are no strictly homographic terms. This gives us for the "true" transform equation:

$$\begin{bmatrix} x' \\ y' \\ 1 \end{bmatrix} = \begin{bmatrix} h_{11} & h_{12} & 0 \\ h_{21} & h_{22} & 0 \\ 0 & 0 & 1 \end{bmatrix} \begin{bmatrix} x \pm \varepsilon \\ y \pm \varepsilon \\ 1 \end{bmatrix} \quad \text{Eq. 4}$$

where $\varepsilon$ is the position tolerance for a geometric match. To see the order of magnitude of the acceptable parameter error given the allowed positional error, the order of magnitude of the $h_{ij}$ is used. That part of the affinity matrix is $A=R(\theta)R(-\varphi)DR(\varphi)$ where $$D = \begin{bmatrix} \lambda_1 & 0 \\ 0 & \lambda_2 \end{bmatrix}$$

with $\lambda_1$ and $\lambda_2$ being the two scalings, $\varphi$ being the angle of the greater stretch (with the other perpendicular), and $\theta$ being the rotational difference between the two acquisitions. Since the elements of the rotation matrices are of order 1, the elements of A are of order $\sqrt{\lambda_1 \lambda_2}$. The allowed error is thus of order $\varepsilon\sqrt{\lambda_1 \lambda_2}$ The similarity transform equation (including scaling and rotation but ignoring translation) is:

$$\begin{bmatrix} x' \\ y' \\ 1 \end{bmatrix} = \begin{bmatrix} s\cos(\theta) & -s\sin(\theta) & 0 \\ s\sin(\theta) & s\cos(\theta) & 0 \\ 0 & 0 & 1 \end{bmatrix} \begin{bmatrix} x \\ y \\ 1 \end{bmatrix} \quad \text{Eq. 5}$$

In equation 5, the upper left four elements can be cast in the form of an affine transform $A'=R(\theta)R(-\varphi)D'R(\varphi)$ where the angles are the same as in the actual affine transform and where $$D' = \begin{bmatrix} s & 0 \\ 0 & s \end{bmatrix}$$

with both stretches being the same because the transform is a similarity. The difference between the (true) affine and the (chosen) similarity transforms is thus $E=R(\theta)R(-\varphi)MR(\varphi)$ where $$M = \begin{bmatrix} \lambda_1 - s & 0 \\ 0 & \lambda_2 - s \end{bmatrix}$$

If L is the region size, the overall error accumulation across the region is of the order $\sqrt{|\lambda_1-s||\lambda_2-s|}*L$. The lower-order transform thus gets us "in the ballpark" of the "true" transform if: $\sqrt{|\lambda_1-s||\lambda_2-s|}*L < \varepsilon\sqrt{\lambda_1 \lambda_2}$ The term on the left is minimized if $$s = \frac{|\lambda_1 + \lambda_2|}{2}$$

Substituting, the term on the left becomes $$\frac{|\lambda_1 - \lambda_2|}{2} L.$$

The lower-order transform is therefore a good approximation to the actual affine transform if $$\frac{|\lambda_1 - \lambda_2|}{2} L < \varepsilon\sqrt{\lambda_1 \lambda_2}$$

If $\lambda_1$ and $\lambda_2$ are relatively close, then $\sqrt{\lambda_1 \lambda_2} \approx s$. So finally, the similarity transform is a good approximation of the affine transform across a region of size, L, if:

$$L < \frac{2\varepsilon s}{|\lambda_1 - \lambda_2|} \quad \text{Eq. 6}$$

Notice that if $\lambda_1$ and $\lambda_2$ are the same, any L will work, which is to be expected since under those circumstances the transform is a similarity. Also notice that as the difference between $\lambda_1$ and $\lambda_2$ increases, L gets smaller for the same allowed positional tolerance.

If it is believed that L covers a sufficient part of the object (because the difference in stretch is relatively small, for example) then the method can start by choosing candidate match pairs from a region of size L in one of the acquisitions (and use the entire area for the other acquisition). Similarly, if the method can determine the scale change and differential stretch between the two acquisitions, the method can estimate the region size (given the tolerance). The method can use that region (on both or on one of the acquisitions as discussed above) to provide the candidate true match pairs. From those candidate match pairs, the method may use RANSAC (described in more detail at llen.wikipedia.org/wiki/Random_sample_consensus)) or other methods to find the parameters for the chosen transform (in this case similarity). Once the method has determined the regions of match and the associated transform parameters, the method can extend coverage to more of the object if necessary, as shown below.

Extending the coverage (process 426 in FIG. 5). To avoid spurious matches, there should be as many matching points as possible, which generally means that they should come from as much of the imaged object as possible. This, of course, is a contradictory requirement to speeding up matching by limiting the choice of match pair candidates. The disclosed method for extending the coverage provides a way around this conundrum and is an illustrative example of the method. It should be noted that not all acts may be necessary and there are other possible approaches familiar to those skilled in the art, but what is presented here effectively extends the coverage region with only a modest increase in the number of match pairs that must be found and tested.

Extend the regions by raising the order of the transform. Once the initial region set is found for the chosen transform, the method may find all strong match pairs (that match to within existing tolerance or a moderate relaxation of that tolerance) that are in or near the region already covered. This typically extends the regions somewhat and adds more candidate match pairs that will be used in the next operation.

Determine higher-order transform parameters (process 428 in FIG. 5). Use the match pairs now known and all other candidate match pairs within the existing regions (even if they failed the geometric test for the lower-order transform with the original tolerance) as inputs to RANSAC (or other approaches) and determine the parameters for the next-higher-order transform. Fit that transform to as large an area as possible. If sufficient area is covered, the method is completed and the matching can be determined. If not, the method goes back to the first acts 426 (with the new transform) and continues until either enough area is covered or the method runs out of transforms. If enough area is covered, the system executing the method evaluates the overall match. Otherwise, it continues until it runs out of possible transforms. The method runs out of transforms when the method has tried to use the highest-order allowed transform (homographic in the examples given here) and that highest-order allowed transform has failed to find sufficient strong matches. After such failure, the method proceeds as discussed in more detail below.

Connect region centers by a higher-order transform. One alternative to extending the regions as described above is to take the original region set (or one determined along the way) and using some characteristic point (e.g., the center) for each one, determine the higher-order transform parameters that match as many as possible of the local regions in the two acquisitions. Because the method is using region centers (or other points) rather than all the match pair candidates across the object, the number of candidate match pairs is quite limited compared to the situation where the method uses point of interest pairs and it may be possible to go straight to homography (or whatever the highest-order parameterized transform may be). From those region matches, determine the parameters for the transform for the entire object and apply those parameters to all candidate match pairs and, using them, refine the parameter estimates. This approach is likely to be much faster than the gradual region expansion discussed above and, if the original regions are large enough, accurate enough to allow the system to finish transform determination and match count quickly. It is understood that the transform that links the region centers and the transforms within each region may be different.

Transforms beyond homography. If, at the end of the above process, the method still has multiple disconnected regions each with its own parameter set, it is very likely that the actual transform is of higher order than homography (especially in cases that attempt to match two acquisitions of the same object). It is possible (for perspective and other transforms) to continue the above process using more match points and higher-dimensional matrices. However, there are transforms that cannot in general be specified by a finite set of parameters and the method taught here may allow matching objects whose viewpoint (e.g., perspective transforms) or shape have changed sufficiently that the method cannot accurately determine or use the actual transform but still succeed in matching the two acquisitions adequately over sufficient parts of the object. In that case, the disclosures herein do not speed up the matching but instead make it possible to do at all where it otherwise could not be completed. Once the parameterizable transforms have run out, the system can combine the found regions in several ways:

Cumulate the matches for the found regions. The goal of the point matching process is to get an estimate of how likely the two acquisitions are to be from the same object. To do this as accurately as possible, the method needs as many true matches across the object as possible. The simplest way to do this is called RARS (for RANSAC Approximate Rubber Sheeting) to accumulate match points garnered from multiple transforms rather than attempting to match the entire surface using a single transform. This process of using multiple transforms to describe the relationship between two objects translates, in practice, to the summing of true match points across multiple regions where the matched regions have different transform parameters. Using this approach, the method avoids having to do anything with the actual transform between the two acquisitions (which may be of high order) and still takes advantage of all true match pairs.

A second, related approach is LARS (Locally-Affine Rubber Sheeting). LARS takes advantage of the fact that any physically-realizable object transform can, when viewed over a small-enough region, be treated as though it were an affine transform. Local regions are matched using LARS with RANSAC choosing candidate match pairs subject to their geometric relationship in the two acquisitions being related by an affine transform. In essence, this approach follows the taught method until the best matching with local affine transforms are accomplished and then the true match points in the various regions are combined to measure overall match. LARS is a special case of a general matching approach: any transform of lower order than the actual transform will result in multiple regions each with a different parameter set. Those parameters describe the lower-order transform within the individual regions. It is possible to stop at finding local regions that match up to a similarity, for example. LARS matches local regions up to an affinity and homography matches them up to an homography. As taught above, if homography is the highest-order transform tried in the pyramiding process, its regions are then linked together to get the overall matches. Thus LARS does for locally-affine regions what the standard technique does for locally-homographic regions when they are insufficient to cover most of the object in a single region (indicating that the actual transform is of higher order than homographic.

A third method uses strong matches but has little or no geometric matching. Instead of filtering match candidates (to turn strong matches into true matches) using their geometric placement, the point of interest's orientation is used as a filter instead. There are numerous methods for determining the orientation of a point of interest, but the direction of the strongest gradient in image pixel values across the point of interest categorization region works well. Strong matches are found and each of the two matching pair's orientation is determined. To constitute a true match the members of the strong match pair set should have consistent orientations. This means that the difference in orientation between the matching pairs in two objects (presumably the test and reference versions of the same object) is consistent across all such strong matches. A further refinement of this approach is to require that true matches in addition come from the same local regions on one acquisition as their corresponding points in the other acquisition. The size of this region is a settable parameter. This approach recognizes that for some distortions between acquisitions only local regions will show consistency (up to the allowed tolerance) in the orientation of matching points of interest.

Connect the regions. In cases where the highest-order attempted transform results in multiple disjoint local regions (instead of covering most of the object), several ways suggest themselves to use the arrangement of the regions to modify the match count accumulation determined above. Consider, for example, two regions both of which match the higher-order transform (but with potentially different parameters) up to some tolerance. The system executing the method could then combine the transform parameters (by an average, a weighted average, or other means) to determine where the region centers (or other characteristic points) should be with respect to each other and penalize the match by how far out of place they are. This could be determined pair-wise, using all the regions at once (similar to the approach described above for determining the region center location transform), or by another other approach. The resulting error can be used to modify the match count in some way to penalize regions being out of place.

"Walk" the regions together. The walking process is used when the overall transform is of higher order than the attempted transforms. This takes place where there is significant rubber sheet distortion of the object, but also where there is a sudden change in the object itself, such as when the image contains a view of a corner of a rectangular solid as well as the two sides forming the corner. The method described herein is an iterative clustering process that starts by searching the image for disjoint regions of matched points. If these cover sufficient parts of the object, walking is not needed. If not, these disjoint regions form the seeds for walking. Each such region comprises points located near each other whose position transforms are characterizable by a single set of parameters (up to positional tolerances). Each such set grows as described below by merging neighboring matched points (if they are inliers for its transform) or by forming new regions with similar transform parameters. The procedure terminates when regions can be further expanded.

If the object is real, it is very likely that even in the case of substantial rubber sheet distortion across the entire object the homographic (and, most likely, even the similarity and affine) parameters change smoothly across most of the image. The method can take advantage of this generally smooth behavior to connect the regions by intermediate regions until an adequate set of match points is found. The method can proceed in several ways here. One that would work and that extends an approach used above to expand regions is to find match pairs outside the existing match regions but on the same side of the previously found regions that match geometrically to within, say, twice the previous parameter. Using those points as a new "region", find the new transform parameters. Proceed in this manner linking as many previously-found regions as possible and count the aggregate matches as the matching parameter. Another way to walk regions together is to consider two regions physically close to each other (in the case where geometry is used to determine whether a strong match is a true match), take the average of their transform parameters, and look for a region between the two that match up to those averaged parameters. For the case where orientation rather than geometry is used to determine true matches, the method can average the parameters for two regions with close but not equal overall orientation and look for new regions with the new average parameter set. Such new regions will not, of course, necessarily be located "between" the two original regions since in this example the system does not have positional information on the points of interest. This approach can be extended to any method for filtering true matches to be strong matches. It is, of course, possible that no smooth parameter changing is possible because two neighboring regions in the object can be very different from each other. An example of this is when a corner of a rectangular solid is viewed so that both sides are in the field of view. In this case the process stops when sufficient parts of the items are matched. Typically this will occur when the smooth walking process described above reaches a region with substantially different parameters. In all of these techniques it is possible to use the total number of match points across the disjoint regions as the true match count (rather than just the match count in the region with the greatest such number).

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated. The teachings of U.S. patent application 63/014,680 is incorporated herein by reference.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A method, comprising:
   retrieving a first set of points of interest of an object from a datastore, the first set of points of interest being acquired for the object at a time;
   receiving, at a time after the first set of points of interest were acquired, a second set of points of interest for the object wherein the second set of points of interest for the object are acquired under a different condition than the first set of points of interest of the object;

performing, by a computer, a transform pyramiding process using the first and second set of points of interest and a hierarchy of transforms to determine if the first and second set of points of interest are true matches despite the different conditions;

identifying, by the computer, one or more match pairs which are each a pair of points of interest in the first and second set of points of interest that substantially match each other; and determining, by the computer, whether a geometric arrangement of the one or more match pairs of the first and second set of points of interests of the object are similar using one or more transforms.

2. The method of claim 1, wherein determining whether the geometric arrangement of the one or more match pairs of the first and second set of points of interests of the object are similar further comprises determining, by the computer, an initial transform to apply to each match pair and finding, by the computer, a set of parameters for the initial transform that position a largest number of the one or more match pairs in a region of the object.

3. The method of claim 2, wherein determining, by the computer, the initial transform further comprises selecting a lowest level transform from the hierarchy of transforms.

4. The method of claim 2, wherein determining whether the geometric arrangement of the one or more match pairs of the first and second set of points of interests of the object are similar further comprises extending the region of the object to identify new match pairs in the first and second sets of points of interest and determining a higher level of transform from the hierarchy of transforms based on the new match pairs.

5. The method of claim 2, wherein determining whether the geometric arrangement of the one or more match pairs of the first and second set of points of interests of the object are similar further comprises performing an action when all of the hierarchy of transforms have been used and did not result in an entire area of the object being covered by the region having the match pairs.

6. The method of claim 5, wherein performing the action when all of the hierarchy of transforms have been used further comprises connecting, by the computer, a center of each region using a higher order transform.

7. The method of claim 5, wherein performing the action when all of the hierarchy of transforms have been used further comprises combining, by the computer, the regions of match pairs on the object.

8. The method of claim 1, wherein identifying the one or more match pairs further comprises performing, by the computer, an asymmetric match point selection in which the points of interest in the first set of points of interest are limited but the points of interest in the second set of points of interest are not limited.

9. The method of claim 1, further comprising generating a feature vector for each set of points of interest wherein each feature vector is a digital fingerprint of the object generated when the set points of interest were acquired.

10. The method of claim 9, further comprising acquiring, for each set of points of interest for the object, the set of points of interest for the object in response to an acquired image of the object.

11. The method of claim 1, wherein the hierarchy of transforms further comprises a similarity transform, an affine transform, and a homographic transform.

12. An authentication system, comprising:

an imager that acquires an image of an object;

a digital fingerprinting process, executed by a computer system, that generates a set of points of interest on the object based on the acquired image of the object;

a datastore, connected to the imager, that stores the set of points of interest for the object generated by the digital fingerprinting process; and a server computer having an authentication unit executed by a processor of the server computer having a plurality of instructions that configure the processor to:

retrieve a first set of points of interest of the object from a datastore, the first set of points of interest being acquired for the object at a time;

receive, at a time after the first set of points of interest were acquired, a second set of points of interest for the object wherein the second set of points of interest for the object are acquired under a different condition than the first set of points of interest of the object;

perform a transform pyramiding process using the first and second set of points of interest and a hierarchy of transforms to determine if the first and second set of points of interest are true matches despite the different conditions;

identify one or more match pairs which are each a pair of points of interest in the first and second set of points of interest that substantially match each other;

determine whether a geometric arrangement of the one or more match pairs of the first and second set of points of interests of the object are similar using one or more transforms; and authenticate the object if the first and second set of points of interest match based on the similarity of the first and second sets of points of interest of the object.

13. The system of claim 12, wherein the processor is further configured to determine an initial transform to apply to each match pair and find a set of parameters for the initial transform that position a largest number of the one or more match pairs in a region of the object.

14. The system of claim 13, wherein the processor is further configured to select a lowest level transform from the hierarchy of transforms.

15. The system of claim 13, wherein the processor is further configured to extend the region of the object to identify new match pairs in the first and second sets of points of interest and determine a higher level of transform from the hierarchy of transforms based on the new match pairs.

16. The system of claim 13, wherein the processor is further configured to perform an action when all of the hierarchy of transforms have been used and did not result in an entire area of the object being covered by the region having the match pairs.

17. The system of claim 16, wherein the processor is further configured to connect a center of each region using a higher order transform.

18. The system of claim 16, wherein the processor is further configured to combine the regions of match pairs on the object.

19. The system of claim 12, wherein the processor is further configured to perform an asymmetric match point selection in which the points of interest in the first set of points of interest are limited but the points of interest in the second set of points of interest are not limited.

20. The system of claim 12, wherein the hierarchy of transforms further comprises a similarity transform, an affine transform and a homographic transform.

21. The system of claim 12, wherein the processor is further configured to generate a feature vector for each set of points of interest wherein each feature vector is a digital fingerprint of the object generated when the set points of interest were acquired.

22. A digital fingerprint matching method, comprising:
retrieving a first set of points of interest of an object from a datastore, the first set of points of interest being acquired for the object at a time;
receiving, at a time after the first set of points of interest were acquired, a second set of points of interest for the object wherein the second set of points of interest for the object are acquired under a different condition than the first set of points of interest of the object;
performing, by a computer, a transform pyramiding process using the first and second set of points of interest and a hierarchy of transforms to determine if the first and second set of points of interest are true matches despite the different conditions;
identifying, by the computer, one or more match pairs which are each a pair of points of interest in the first and second set of points of interest that substantially match each other;
determining, by the computer, whether a geometric arrangement of the one or more match pairs of the first and second set of points of interests of the object are similar using one or more transforms;
generating a feature vector for each set of points of interest; and
matching the feature vector for each of the first and second set of points of interest based on the similarity of the feature vectors.

23. The method of claim 22, wherein determining whether the geometric arrangement of the one or more match pairs of the first and second set of points of interests of the object are similar further comprises determining, by the computer, an initial transform to apply to each match pair and finding, by the computer, a set of parameters for the initial transform that positions a largest number of the one or more match pairs in a region of the object.

24. The method of claim 23, wherein determining, by the computer, the initial transform further comprises selecting a lowest level transform from the hierarchy of transforms.

25. The method of claim 23, wherein determining whether the geometric arrangement of the one or more match pairs of the first and second set of points of interests of the object are similar further comprises extending the region of the object to identify new match pairs in the first and second sets of points of interest and determining a higher level of transform from the hierarchy of transforms based on the new match pairs.

26. The method of claim 23, wherein determining whether the geometric arrangement of the one or more match pairs of the first and second set of points of interests of the object are similar further comprises performing an action when all of the hierarchy of transforms have been used and did not result in an entire area of the object being covered by the region having the match pairs.

27. The method of claim 26, wherein performing the action when all of the hierarchy of transforms have been used further comprises connecting, by the computer, a center of each region using a higher order transform.

28. The method of claim 26, wherein performing the action when all of the hierarchy of transforms have been used further comprises combining, by the computer, the regions of match pairs on the object.

29. The method of claim 22, wherein identifying the one or more match pairs further comprises performing, by the computer, an asymmetric match point selection in which the points of interest in the first set of points of interest are limited but the points of interest in the second set of points of interest are not limited.

30. The method of claim 22, wherein the hierarchy of transforms further comprises a similarity transform, an affine transform and a homographic transform.

* * * * *